(12) United States Patent
MacKay et al.

(10) Patent No.: US 9,494,922 B2
(45) Date of Patent: Nov. 15, 2016

(54) SINGLE SPACE WIRELESS PARKING WITH IMPROVED ANTENNA PLACEMENTS

(75) Inventors: George Allan MacKay, New Glasgow (CA); Gregory Emile Chauvin, Brookside (CA); Neil Stuart Erskine, Halifax (CA); Darren Scott Cameron, New Glasgow (CA); Donald Wesley Church, Halifax (CA); Ben Garvey, Halifax (CA); Josh Michael Bablitah, Port Washington, WI (US); Matt Gonia, Hubertus, WI (US); Glenn Eric Pederson, Sussex, WI (US); Robert Thomas Buczkiewicz, West Bend, WI (US)

(73) Assignee: J.J. MACKAY CANADA LIMITED (CA)

(*) Notice: Subject to any disclaimer, the term of this patent is extended or adjusted under 35 U.S.C. 154(b) by 0 days.

(21) Appl. No.: 13/141,977

(22) PCT Filed: Nov. 18, 2009

(86) PCT No.: PCT/CA2009/001657
§ 371 (c)(1),
(2), (4) Date: Jul. 22, 2011

(87) PCT Pub. No.: WO2010/071974
PCT Pub. Date: Jul. 1, 2010

(65) Prior Publication Data
US 2011/0276519 A1   Nov. 10, 2011

Related U.S. Application Data

(60) Provisional application No. 61/140,543, filed on Dec. 23, 2008.

(51) Int. Cl.
G07B 15/02    (2011.01)
G04C 11/00    (2006.01)
G04G 7/00     (2006.01)
G06Q 30/02    (2012.01)
H04W 52/02    (2009.01)
G07C 1/30     (2006.01)

(52) U.S. Cl.
CPC ............. *G04C 11/026* (2013.01); *G04G 7/026* (2013.01); *G06Q 30/0284* (2013.01); *G07B 15/02* (2013.01); *G07C 1/30* (2013.01); *H04W 52/0235* (2013.01)

(58) Field of Classification Search
CPC ...... G07B 15/02; G07F 17/24; G07F 17/248
USPC ..................................... 705/418, 13
See application file for complete search history.

(56) References Cited

U.S. PATENT DOCUMENTS

| | | | |
|---|---|---|---|
| 480,108 A | 8/1892 | Loch | 232/62 |
| 1,189,991 A | 7/1916 | Mugler | 70/120 |

(Continued)

FOREIGN PATENT DOCUMENTS

| | | | |
|---|---|---|---|
| AU | 4035701 | 9/2001 | G07F 17/24 |
| AU | 200227724 | 1/2003 | G07C 1/30 |

(Continued)

OTHER PUBLICATIONS

US 8,636,133, 01/2014, MacKay et al. (withdrawn)

(Continued)

*Primary Examiner* — Brian Epstein
(74) *Attorney, Agent, or Firm* — Hayes Soloway P.C.

(57) ABSTRACT

A parking meter with an antenna for radio frequency (RF) communication is provided. An antenna for the parking meter may be located in order to transmit the RF signals through a transmission path comprising at least a portion of the parking meter that provides a low attenuation of RF signals.

36 Claims, 17 Drawing Sheets

(56) References Cited

U.S. PATENT DOCUMENTS

| | | | |
|---|---|---|---|
| 1,445,771 A | 2/1923 | Keplinger | |
| 1,818,568 A | 8/1931 | Melick | 194/203 |
| D98,810 S | 3/1936 | Magee | |
| D100,875 S | 8/1936 | Michaels | |
| D101,237 S | 9/1936 | Miller | |
| D107,577 S | 12/1937 | McGay | D10/42 |
| 2,118,318 A | 5/1938 | Magee | 194/84 |
| D112,677 S | 12/1938 | Broussard et al. | |
| 2,161,046 A | 6/1939 | Hitzeman | 194/205 |
| D116,805 S | 9/1939 | Reznek | |
| 2,229,183 A | 1/1941 | Mitchell | 194/277 |
| 2,261,353 A | 11/1941 | Gaetano | 70/120 |
| 2,289,838 A | 7/1942 | Herschede et al. | 194/226 |
| D152,294 S | 1/1949 | Siegel et al. | D20/10 |
| D152,587 S | 2/1949 | Brundage | D52/3 |
| D154,716 S | 8/1949 | Simpson | D10/42 |
| 2,483,805 A | 10/1949 | Broussard et al. | 232/1 |
| 2,495,784 A | 1/1950 | Starts | |
| D162,698 S | 3/1951 | Teague | D52/3 |
| 2,546,433 A | 3/1951 | Dick | 368/6 |
| 2,547,272 A | 4/1951 | Lawson et al. | 116/282 |
| 2,550,433 A | 4/1951 | Tichenor | 224/1 |
| D166,059 S | 2/1952 | Yoss | D10/42 |
| 2,594,388 A | 4/1952 | Broussard | 194/1 |
| 2,595,124 A | 4/1952 | Campbell | 250/27 |
| D166,753 S | 5/1952 | Jones | D10/42 |
| 2,596,122 A | 5/1952 | Broussard | 194/101 |
| 2,596,123 A | 5/1952 | Broussard | 194/1 |
| 2,596,124 A | 5/1952 | Broussard | 368/90 |
| 2,599,881 A | 6/1952 | Woodruff | 368/92 |
| 2,613,792 A | 10/1952 | Broussard | 194/72 |
| 2,613,871 A | 10/1952 | Broussard et al. | 232/16 |
| 2,618,371 A | 11/1952 | Broussard | 194/84 |
| 2,633,960 A | 4/1953 | Broussard | 194/72 |
| D181,359 S | 11/1957 | Jones | D10/42 |
| 2,818,371 A | 12/1957 | Wessinger | 167/93 |
| 2,822,682 A | 2/1958 | Sollenberger | 70/158 |
| 2,832,506 A | 4/1958 | Hatcher | 221/103 |
| D189,106 S | 10/1960 | Leiderman | D52/3 |
| 2,956,525 A | 10/1960 | Blauvelt | 109/59 |
| 2,985,978 A | 5/1961 | Breen et al. | 40/333 |
| 2,988,191 A | 6/1961 | Grant | 194/1 |
| 2,995,230 A | 8/1961 | Moody et al. | 194/9 |
| 3,018,615 A | 1/1962 | Minton et al. | 368/7 |
| 3,056,544 A | 10/1962 | Sollenberger et al. | 232/16 |
| D199,270 S | 9/1964 | Michales | D52/3 |
| D200,216 S | 2/1965 | Broussard | D52/3 |
| 3,183,411 A | 5/1965 | Palfi | 317/123 |
| 3,199,321 A | 8/1965 | Sollenberger | 70/1.5 |
| 3,204,438 A | 9/1965 | Sollenberger | 70/417 |
| 3,208,061 A * | 9/1965 | Gervasi et al. | 340/539.31 |
| 3,262,540 A | 7/1966 | Sollenberger et al. | 194/72 |
| 3,272,299 A | 9/1966 | Sollenberger | 194/2 |
| 3,324,647 A * | 6/1967 | Jedynak | G07F 17/246 307/652 |
| 3,373,856 A | 3/1968 | Kusters et al. | 194/100 |
| 3,438,031 A | 4/1969 | Fathauer | 343/8 |
| 3,486,324 A | 12/1969 | Andersson | 368/90 |
| 3,519,113 A | 7/1970 | Arzig et al. | 194/2 |
| 3,535,870 A | 10/1970 | Mitchell | 58/142 |
| 3,565,283 A | 2/1971 | Sciacero et al. | 221/197 |
| 3,637,277 A | 1/1972 | Krug et al. | 312/217 |
| 3,666,067 A | 5/1972 | Kaiser | 194/225 |
| 3,721,463 A | 3/1973 | Attwood et al. | 287/20.3 |
| 3,941,989 A | 3/1976 | McLaughlin et al. | 235/156 |
| 3,975,934 A | 8/1976 | Babai et al. | 70/120 |
| 3,982,620 A | 9/1976 | Kortenhaus | 194/1 N |
| 3,991,595 A | 11/1976 | Bahry et al. | 70/120 |
| 3,999,372 A | 12/1976 | Welch et al. | 58/142 |
| 4,031,991 A | 6/1977 | Malott | 194/1 R |
| 4,043,117 A | 8/1977 | Maresca et al. | 58/142 |
| 4,237,710 A | 12/1980 | Cardozo | 70/108 |
| 4,248,336 A | 2/1981 | Fiedler | 194/97 |
| 4,249,648 A | 2/1981 | Meyer | 194/102 |
| 4,264,963 A | 4/1981 | Leach | 364/707 |
| 4,306,219 A | 12/1981 | Main et al. | 340/825.54 |
| 4,317,180 A | 2/1982 | Lies | 364/707 |
| 4,317,181 A | 2/1982 | Teza et al. | 364/707 |
| 4,323,847 A | 4/1982 | Karbowski | 324/327 |
| 4,379,334 A | 4/1983 | Feagins, Jr. et al. | 364/467 |
| 4,409,665 A | 10/1983 | Tubbs | 364/707 |
| 4,432,447 A | 2/1984 | Tanaka | 194/100 |
| 4,460,080 A | 7/1984 | Howard | 194/100 A |
| 4,474,281 A | 10/1984 | Roberts et al. | 194/1 N |
| 4,479,191 A | 10/1984 | Nojima et al. | 364/707 |
| 4,483,431 A | 11/1984 | Pratt | 194/97 |
| D278,689 S | 5/1985 | Jupe | D10/42 |
| 4,574,936 A | 3/1986 | Klinger | 194/318 |
| 4,639,021 A | 1/1987 | Hope | 292/7 |
| 4,678,994 A | 7/1987 | Davies | 324/236 |
| 4,742,903 A | 5/1988 | Trummer | 194/317 |
| 4,749,074 A | 6/1988 | Ueki et al. | 194/317 |
| D296,795 S | 7/1988 | Bouve | D20/10 |
| 4,763,769 A | 8/1988 | Levasseur | 194/217 |
| 4,809,838 A | 3/1989 | Houserman | 194/317 |
| 4,812,805 A | 3/1989 | Lachat et al. | 340/825.05 |
| 4,823,928 A | 4/1989 | Speas | |
| 4,825,425 A | 4/1989 | Turner | 368/7 |
| 4,827,206 A | 5/1989 | Speas | 323/299 |
| 4,845,484 A | 7/1989 | Ellsberg | 340/825.35 |
| 4,848,556 A | 7/1989 | Shah et al. | 194/212 |
| 4,851,987 A | 7/1989 | Day | 364/200 |
| 4,872,149 A | 10/1989 | Speas | 368/90 |
| 4,875,598 A | 10/1989 | Dahl | 221/4 |
| 4,880,097 A | 11/1989 | Speas | 194/239 |
| 4,880,406 A | 11/1989 | Van Horn et al. | 464/38 |
| 4,895,238 A | 1/1990 | Speas | 194/319 |
| 4,951,799 A | 8/1990 | Kai | 194/317 |
| 4,967,895 A | 11/1990 | Speas | 194/200 |
| 4,976,630 A | 12/1990 | Schuder et al. | 439/260 |
| 4,989,714 A | 2/1991 | Abe | 194/317 |
| 5,027,935 A | 7/1991 | Berg et al. | 194/318 |
| D319,077 S | 8/1991 | Arato et al. | D20/6 |
| 5,060,777 A | 10/1991 | Van Horn et al. | 194/317 |
| 5,065,156 A | 11/1991 | Bernier | 340/932.2 |
| 5,076,414 A | 12/1991 | Kimoto | 194/317 |
| 5,088,073 A | 2/1992 | Speas | 368/90 |
| 5,109,972 A | 5/1992 | Van Horn et al. | 194/217 |
| 5,119,916 A | 6/1992 | Carmen et al. | 194/210 |
| 5,155,614 A | 10/1992 | Carmen et al. | 398/202 |
| 5,158,166 A | 10/1992 | Barson | 194/319 |
| 5,184,707 A | 2/1993 | Van Horn et al. | 194/204 |
| 5,192,855 A | 3/1993 | Insulander et al. | 235/381 |
| D336,860 S | 6/1993 | Clough | D10/42 |
| 5,222,076 A | 6/1993 | Ng et al. | 375/9 |
| 5,244,070 A | 9/1993 | Carmen et al. | 194/319 |
| D340,038 S | 10/1993 | Venne et al. | D14/420 |
| 5,259,491 A | 11/1993 | Ward, II | 194/350 |
| 5,266,947 A | 11/1993 | Fujiwara et al. | 340/932.2 |
| D342,209 S | 12/1993 | Clough | D10/42 |
| 5,273,151 A | 12/1993 | Carmen et al. | 194/319 |
| 5,287,384 A | 2/1994 | Avery et al. | |
| 5,293,979 A | 3/1994 | Levasseur | 194/317 |
| 5,298,894 A * | 3/1994 | Cerny | G01D 4/006 324/74 |
| 5,343,237 A | 8/1994 | Morimoto | 348/143 |
| D351,193 S | 10/1994 | Abe | D20/9 |
| 5,351,798 A | 10/1994 | Hayes | 194/318 |
| 5,360,095 A | 11/1994 | Speas | 194/217 |
| D354,835 S | 1/1995 | Brendel | D99/43 |
| 5,382,780 A | 1/1995 | Carmen | 235/384 |
| 5,402,475 A | 3/1995 | Lesner, Jr. et al. | 379/106 |
| 5,407,049 A | 4/1995 | Jacobs | 194/200 |
| D360,734 S | 7/1995 | Hall | D99/28 |
| 5,439,089 A | 8/1995 | Parker | 194/317 |
| 5,442,348 A | 8/1995 | Mushell | 340/932.2 |
| 5,454,461 A | 10/1995 | Jacobs | 194/200 |
| 5,471,139 A | 11/1995 | Zadoff | 324/244.1 |
| 5,475,373 A | 12/1995 | Speas | 340/815.58 |
| 5,489,014 A | 2/1996 | Menoud | 194/211 |
| 5,500,517 A | 3/1996 | Cagliostro | 235/486 |
| 5,526,662 A | 6/1996 | Diekhoff et al. | 70/278 |
| 5,563,491 A * | 10/1996 | Tseng | B60L 11/1816 194/904 |

(56) References Cited

U.S. PATENT DOCUMENTS

| | | | |
|---|---|---|---|
| 5,568,441 A | 10/1996 | Sanemitsu | 365/229 |
| D375,607 S | 11/1996 | Hall | D99/28 |
| 5,570,771 A | 11/1996 | Jacobs | 194/200 |
| 5,614,892 A | 3/1997 | Ward, II et al. | 340/870.02 |
| 5,617,942 A | 4/1997 | Ward, II et al. | 194/217 |
| 5,640,002 A | 6/1997 | Ruppert et al. | 235/472 |
| 5,642,119 A | 6/1997 | Jacobs | |
| 5,648,906 A | 7/1997 | Amirpanahi | 705/418 |
| D381,976 S | 8/1997 | Sandor et al. | D14/420 |
| 5,659,306 A | 8/1997 | Bahar | 340/932.2 |
| 5,687,129 A | 11/1997 | Kim | 365/229 |
| D388,231 S | 12/1997 | Magee et al. | D99/28 |
| 5,710,743 A * | 1/1998 | Dee | G07F 17/248 194/217 |
| D391,238 S | 2/1998 | Sakata | D14/420 |
| 5,732,812 A | 3/1998 | Grainger et al. | 194/217 |
| D393,212 S | 4/1998 | Lucas | D10/42 |
| 5,737,710 A | 4/1998 | Anthonyson | 701/1 |
| 5,740,050 A | 4/1998 | Ward, II | 364/464.28 |
| 5,748,103 A | 5/1998 | Flach et al. | 340/870.07 |
| D395,133 S | 6/1998 | Mikami et al. | D99/43 |
| 5,761,061 A | 6/1998 | Amano | 364/187 |
| 5,777,302 A | 7/1998 | Nakagawa et al. | 235/7 A |
| 5,777,951 A | 7/1998 | Mitschele et al. | 368/90 |
| 5,778,067 A | 7/1998 | Jones et al. | 380/24 |
| D396,655 S | 8/1998 | Anderson | D10/42 |
| 5,803,228 A | 9/1998 | Lucas | 194/228 |
| 5,805,083 A | 9/1998 | Sutton et al. | 340/932.2 |
| 5,806,651 A | 9/1998 | Carmen et al. | 194/319 |
| D400,115 S | 10/1998 | Yaron et al. | D10/104 |
| 5,833,042 A | 11/1998 | Baitch et al. | 194/217 |
| 5,841,369 A | 11/1998 | Sutton et al. | 340/932.2 |
| 5,842,411 A | 12/1998 | Johnson | 101/36 |
| 5,845,268 A | 12/1998 | Moore | 705/418 |
| 5,852,411 A | 12/1998 | Jacobs et al. | 340/932.2 |
| D404,025 S | 1/1999 | Van Horne et al. | D14/331 |
| 5,903,520 A | 5/1999 | Dee et al. | 368/90 |
| 5,906,260 A | 5/1999 | Goodrich | 194/203 |
| 5,911,763 A | 6/1999 | Quesada | 70/120 |
| D411,848 S | 7/1999 | Maruska et al. | D16/202 |
| D412,289 S | 7/1999 | Winwood | D10/42 |
| D413,311 S | 8/1999 | Blalock | D14/420 |
| 5,940,481 A | 8/1999 | Zeitman | 379/114 |
| 5,954,182 A | 9/1999 | Wei | 194/345 |
| 5,966,345 A | 10/1999 | Dee et al. | 368/90 |
| 6,026,946 A | 2/2000 | McCarty, Jr. | 194/317 |
| 6,037,880 A | 3/2000 | Manion | 340/932.2 |
| 6,052,453 A | 4/2000 | Sagady et al. | 379/146 |
| 6,078,272 A | 6/2000 | Jacobs et al. | 340/932.2 |
| 6,081,205 A | 6/2000 | Williams | 340/932.2 |
| 6,081,206 A | 6/2000 | Kielland | 340/937 |
| 6,082,153 A | 7/2000 | Schoell et al. | 70/1.5 |
| 6,098,361 A | 8/2000 | Roten et al. | 52/298 |
| 6,107,942 A | 8/2000 | Yoo et al. | 340/932.2 |
| 6,109,418 A | 8/2000 | Yost | 194/350 |
| 6,111,522 A | 8/2000 | Hiltz et al. | 340/932.2 |
| 6,116,403 A | 9/2000 | Kiehl | 194/217 |
| D431,788 S | 10/2000 | Tuxen et al. | D10/42 |
| 6,147,624 A | 11/2000 | Clapper | 340/932.2 |
| 6,193,045 B1 | 2/2001 | Ishida et al. | 194/203 |
| 6,195,015 B1 | 2/2001 | Jacobs et al. | 340/693.9 |
| D439,591 S | 3/2001 | Reidt et al. | D16/208 |
| RE37,193 E | 5/2001 | Ward et al. | 194/217 |
| 6,229,455 B1 | 5/2001 | Yost et al. | 340/943 |
| 6,230,868 B1 | 5/2001 | Tuxen et al. | 194/217 |
| 6,243,028 B1 | 6/2001 | Krygler et al. | 340/932.2 |
| 6,243,029 B1 | 6/2001 | Tomer | 340/932.2 |
| 6,275,169 B1 | 8/2001 | Krygler et al. | 340/932.2 |
| 6,275,170 B1 * | 8/2001 | Jacobs | G07F 17/248 340/693.12 |
| D447,714 S | 9/2001 | Cappiello | D10/104 |
| D448,910 S | 10/2001 | Kit et al. | D99/28 |
| D449,010 S | 10/2001 | Petrucelli | D10/109 |
| 6,309,098 B1 | 10/2001 | Wong | 368/94 |
| D450,253 S | 11/2001 | Marguet | D10/42 |
| 6,312,152 B2 | 11/2001 | Dee et al. | 368/90 |
| 6,321,201 B1 | 11/2001 | Dahl | 705/1 |
| RE37,531 E | 1/2002 | Chaco et al. | 379/38 |
| 6,340,935 B1 | 1/2002 | Hall | 340/932.2 |
| D454,421 S | 3/2002 | Jeon et al. | D99/28 |
| D454,807 S | 3/2002 | Cappiello | D10/109 |
| 6,354,425 B1 | 3/2002 | Tuxen et al. | 194/350 |
| 6,366,220 B1 | 4/2002 | Elliott | 340/928 |
| 6,373,422 B1 | 4/2002 | Mostafa | 341/155 |
| 6,373,442 B1 * | 4/2002 | Thomas | H01Q 1/22 343/700 MS |
| D460,005 S | 7/2002 | Jacquet | D10/42 |
| D461,728 S | 8/2002 | Tuxen et al. | D10/42 |
| 6,456,491 B1 | 9/2002 | Flannery et al. | 361/685 |
| D463,749 S | 10/2002 | Petrucelli | D10/109 |
| 6,457,586 B2 | 10/2002 | Yasuda et al. | 209/534 |
| 6,467,602 B2 | 10/2002 | Bench et al. | 194/217 |
| 6,477,875 B2 | 11/2002 | Field et al. | 70/491 |
| D467,954 S | 12/2002 | Suzuki et al. | D16/208 |
| 6,493,676 B1 | 12/2002 | Levy | 705/13 |
| 6,505,774 B1 | 1/2003 | Fulcher et al. | |
| D471,238 S | 3/2003 | Showers et al. | D20/8 |
| D472,362 S | 3/2003 | Zerman et al. | D99/28 |
| 6,575,281 B2 | 6/2003 | Lee | 192/49 |
| D477,030 S | 7/2003 | Kolls et al. | D20/8 |
| D481,516 S | 10/2003 | Magee et al. | D99/28 |
| D485,417 S | 1/2004 | Magee et al. | D99/28 |
| 6,697,730 B2 | 2/2004 | Dickerson | 701/200 |
| D488,280 S | 4/2004 | Zerman et al. | D99/28 |
| D492,080 S | 6/2004 | Magee et al. | D99/28 |
| D492,081 S | 6/2004 | Magee et al. | D99/28 |
| 6,747,575 B2 | 6/2004 | Chauvin et al. | 340/932.2 |
| D494,730 S | 8/2004 | Magee et al. | D99/28 |
| 6,791,473 B2 | 9/2004 | Kibria et al. | 340/932.2 |
| RE38,626 E | 10/2004 | Kielland | 340/937 |
| D497,393 S | 10/2004 | Herbst | D20/99 |
| 6,799,387 B2 | 10/2004 | Pippins | 37/456 |
| D497,814 S | 11/2004 | Odinotski et al. | D10/42 |
| D498,795 S | 11/2004 | Nunn | D20/8 |
| 6,823,317 B1 | 11/2004 | Ouimet et al. | 705/13 |
| 6,856,922 B1 | 2/2005 | Austin et al. | 702/63 |
| 6,874,340 B1 | 4/2005 | Berman | 7/161 |
| D505,240 S | 5/2005 | Swaine et al. | D99/28 |
| 6,889,899 B2 | 5/2005 | Silberberg | 235/384 |
| D506,509 S | 6/2005 | Nunn | D20/9 |
| D506,769 S | 6/2005 | Asai | D16/203 |
| 6,914,411 B2 | 7/2005 | Couch et al. | 320/101 |
| D508,064 S | 8/2005 | Ramirez | D16/200 |
| 6,929,179 B2 | 8/2005 | Fulcher et al. | 235/381 |
| D510,751 S | 10/2005 | Magee et al. | D20/3 |
| 7,004,385 B1 | 2/2006 | Douglass | 235/379 |
| 7,014,355 B2 | 3/2006 | Potter, Sr. et al. | 368/90 |
| 7,019,420 B2 | 3/2006 | Kogan et al. | 307/150 |
| 7,019,670 B2 | 3/2006 | Bahar | 340/932.2 |
| 7,027,773 B1 | 4/2006 | McMillin | 455/41.2 |
| 7,028,888 B2 | 4/2006 | Laskowski | 235/379 |
| 7,029,167 B1 | 4/2006 | Mitschele | 368/90 |
| 7,040,534 B2 | 5/2006 | Turocy et al. | 235/379 |
| D524,834 S | 7/2006 | Dozier et al. | D16/200 |
| 7,071,839 B2 | 7/2006 | Patel et al. | 340/933 |
| 7,104,447 B1 | 9/2006 | Lopez et al. | 235/384 |
| 7,114,651 B2 | 10/2006 | Hjelmvik | 235/384 |
| 7,181,426 B2 | 2/2007 | Dutta | 705/37 |
| 7,183,999 B2 | 2/2007 | Matthews et al. | 345/1.1 |
| D538,505 S | 3/2007 | Kang et al. | D99/28 |
| D543,588 S | 5/2007 | Herbert et al. | D20/8 |
| 7,222,031 B2 | 5/2007 | Heatley | |
| 7,222,782 B2 | 5/2007 | Lute, Jr. et al. | 235/379 |
| 7,237,176 B2 | 6/2007 | Briggs et al. | 714/67 |
| D546,365 S | 7/2007 | Jost et al. | D16/221 |
| 7,237,716 B2 | 7/2007 | Silberberg | 235/384 |
| 7,253,747 B2 | 8/2007 | Noguchi | 340/932.2 |
| 7,284,692 B1 | 10/2007 | Douglass | 235/379 |
| 7,319,974 B1 | 1/2008 | Brusseaux | 705/13 |
| 7,330,131 B2 | 2/2008 | Zanotti et al. | 340/932.2 |
| D570,920 S | 6/2008 | Choi | D20/2 |
| 7,382,238 B2 | 6/2008 | Kavaler | 340/438 |
| 7,382,281 B2 | 6/2008 | Kavaler | 340/941 |
| 7,382,282 B2 | 6/2008 | Kavaler | 340/941 |

(56) References Cited

U.S. PATENT DOCUMENTS

| | | | |
|---|---|---|---|
| 7,388,349 B2 | 6/2008 | Elder et al. | 320/104 |
| 7,388,517 B2 | 6/2008 | Kavaler | 340/941 |
| 7,393,134 B2 | 7/2008 | Mitschele | 368/90 |
| D575,168 S | 8/2008 | King et al. | D10/42 |
| 7,419,091 B1 | 9/2008 | Scanlon | 235/379 |
| 7,427,931 B1 | 9/2008 | Kavaler et al. | 340/941 |
| D579,795 S | 11/2008 | Martinez et al. | D10/42 |
| 7,445,144 B2 | 11/2008 | Schlabach et al. | 235/379 |
| D582,125 S | 12/2008 | Kang et al. | D99/28 |
| D587,141 S | 2/2009 | King et al. | D10/42 |
| 7,533,802 B1 | 5/2009 | McGinley et al. | 235/379 |
| D596,374 S | 7/2009 | Kang et al. | D99/28 |
| 7,594,235 B2 | 9/2009 | Moreau | 719/310 |
| D602,225 S | 10/2009 | Lute et al. | D99/28 |
| 7,617,120 B2 | 11/2009 | Derasmo et al. | 705/13 |
| D605,145 S | 12/2009 | Kellar | D14/125 |
| 7,624,919 B2 | 12/2009 | Meek et al. | 235/379 |
| 7,699,224 B2 | 4/2010 | Molé | 235/439 |
| D615,274 S | 5/2010 | Kim et al. | D99/28 |
| D617,799 S | 6/2010 | Odhe et al. | D14/420 |
| 7,739,000 B2 | 6/2010 | Kevaler | 701/1 |
| 7,748,620 B2 | 7/2010 | Gomez et al. | 235/383 |
| 7,772,720 B2 | 8/2010 | McGee et al. | 307/66 |
| 7,780,072 B1 | 8/2010 | Lute et al. | 235/379 |
| D625,305 S | 10/2010 | Bleck et al. | D14/307 |
| 7,806,248 B2 | 10/2010 | Hunter et al. | 194/317 |
| D627,814 S | 11/2010 | Tzeng et al. | D16/202 |
| 7,825,826 B2 | 11/2010 | Welch | 340/932.2 |
| 7,854,310 B2 | 12/2010 | King et al. | 194/350 |
| 7,855,661 B2 | 12/2010 | Ponert | 340/932.2 |
| 7,874,482 B2 | 1/2011 | Mitschele | 235/384 |
| D632,740 S | 2/2011 | Adeline | D20/2 |
| 7,933,841 B2 | 4/2011 | Schmeyer et al. | 705/64 |
| D645,223 S | 9/2011 | Bleck et al. | D99/28 |
| 8,035,533 B2 | 10/2011 | Kavaler | 340/933 |
| D652,329 S | 1/2012 | MacKay et al. | D10/42 |
| D652,872 S | 1/2012 | Mougin et al. | D20/1 |
| D653,014 S | 1/2012 | Rohan et al. | D99/28 |
| D653,420 S | 1/2012 | Rohan et al. | D99/28 |
| D653,421 S | 1/2012 | Rohan et al. | D99/28 |
| D653,424 S | 1/2012 | Rohan et al. | D99/28 |
| D654,816 S | 2/2012 | MacKay et al. | D10/42 |
| RE43,245 E | 3/2012 | Ouimet et al. | 705/13 |
| D655,263 S | 3/2012 | Tsai | D14/125 |
| D656,046 S | 3/2012 | MacKay et al. | D10/42 |
| 8,138,950 B1 * | 3/2012 | Leung | G06Q 30/0284 235/382 |
| 8,144,034 B2 | 3/2012 | Kavaler | 340/941 |
| D659,557 S | 5/2012 | Jones et al. | D10/42 |
| 8,184,019 B2 | 5/2012 | Chauvin et al. | 340/932.2 |
| D661,603 S | 6/2012 | MacKay et al. | D10/42 |
| 8,193,540 B2 | 6/2012 | Huang et al. | 257/81 |
| 8,232,894 B2 | 7/2012 | Weiss et al. | 340/932.2 |
| 8,264,401 B1 | 9/2012 | Kavaler | 342/128 |
| 8,279,107 B2 | 10/2012 | Krstanovic et al. | 342/27 |
| D672,525 S | 12/2012 | Lee et al. | D99/28 |
| D674,985 S | 1/2013 | Lee | D99/28 |
| D677,035 S | 2/2013 | Lee et al. | D99/28 |
| 8,395,532 B2 | 3/2013 | Chauvin et al. | 340/932.2 |
| 8,402,281 B2 | 3/2013 | Dahl | 718/189 |
| D680,156 S | 4/2013 | Hernandez et al. | D18/4.4 |
| D681,717 S | 5/2013 | Helgesson et al. | D18/4.6 |
| 8,450,627 B2 | 5/2013 | Mittleman et al. | 200/600 |
| D683,779 S | 6/2013 | Uemachi et al. | D16/202 |
| D683,794 S | 6/2013 | Randall | D20/8 |
| D683,795 S | 6/2013 | Randall | D20/8 |
| D684,745 S | 6/2013 | Reuter et al. | D99/28 |
| D684,870 S | 6/2013 | Jones et al. | D10/42 |
| 8,479,909 B2 | 7/2013 | King et al. | 194/302 |
| 8,487,754 B2 | 7/2013 | Mitschele | 340/539.1 |
| 8,513,832 B2 | 8/2013 | Hunter et al. | 307/66 |
| D690,771 S | 10/2013 | Randall | D20/9 |
| D691,165 S | 10/2013 | Attoma | D14/486 |
| 8,566,159 B2 | 10/2013 | King et al. | 705/14.53 |
| D693,983 S | 11/2013 | Budde et al. | D99/28 |
| 8,589,216 B2 | 11/2013 | Yu et al. | 705/13 |
| 8,590,687 B2 | 11/2013 | King et al. | 194/350 |
| 8,595,054 B2 | 11/2013 | King et al. | 705/13 |
| D696,484 S | 12/2013 | Lee et al. | D99/28 |
| D696,485 S | 12/2013 | Lee et al. | D99/28 |
| 8,631,921 B2 | 1/2014 | Jones et al. | 194/350 |
| 8,662,279 B2 | 3/2014 | Jones et al. | 194/350 |
| 8,666,801 B2 | 3/2014 | Cho | 705/13 |
| D702,913 S | 4/2014 | Budde et al. | D99/28 |
| D702,914 S | 4/2014 | Budde et al. | D99/28 |
| 8,684,158 B2 | 4/2014 | Jones et al. | 194/215 |
| D705,090 S | 5/2014 | MacKay et al. | D10/42 |
| 8,727,207 B1 | 5/2014 | Church et al. | 235/33 |
| D707,140 S | 6/2014 | King et al. | D10/42 |
| D707,141 S | 6/2014 | King et al. | D10/42 |
| D707,142 S | 6/2014 | King et al. | D10/42 |
| 8,749,403 B2 | 6/2014 | King et al. | 340/932.2 |
| 8,770,371 B2 | 7/2014 | MacKay et al. | 194/350 |
| 8,807,317 B2 | 8/2014 | MacKay et al. | 194/350 |
| D714,165 S | 9/2014 | Salama | D10/42 |
| D716,156 S | 10/2014 | Jones et al. | D10/42 |
| D716,515 S | 10/2014 | Cha et al. | D99/28 |
| 8,862,494 B2 | 10/2014 | King et al. | 705/13 |
| D716,671 S | 11/2014 | Jones et al. | D10/42 |
| D722,740 S | 2/2015 | Budde et al. | D99/28 |
| D724,290 S | 3/2015 | Cha et al. | D99/28 |
| D724,811 S | 3/2015 | Reitinger | D99/28 |
| D724,812 S | 3/2015 | Cha et al. | D99/28 |
| D728,190 S | 4/2015 | Sheley | D99/28 |
| 9,002,723 B2 | 4/2015 | King et al. | 340/932.2 |
| 9,047,712 B2 | 6/2015 | King et al. | 705/1.1 |
| D733,585 S | 7/2015 | Jones et al. | D10/42 |
| D735,437 S | 7/2015 | Randall | D99/28 |
| D735,438 S | 7/2015 | Randall | D99/28 |
| D735,439 S | 7/2015 | Randall | D99/28 |
| D735,440 S | 7/2015 | Randall | D99/28 |
| D735,963 S | 8/2015 | Randall | D99/28 |
| D735,964 S | 8/2015 | Randall | D99/28 |
| D735,965 S | 8/2015 | Randall | D99/28 |
| D739,637 S | 9/2015 | Randall | D99/28 |
| D739,638 S | 9/2015 | Randall | D99/28 |
| D739,639 S | 9/2015 | Randall | D99/28 |
| 9,127,964 B2 | 9/2015 | Schwarz et al. | 340/943 |
| D742,090 S | 10/2015 | Randall | D99/28 |
| 9,196,097 B2 | 11/2015 | Jones et al. | 340/870.02 |
| D746,015 S | 12/2015 | King et al. | D99/28 |
| D748,364 S | 1/2016 | King et al. | D99/28 |
| D748,888 S | 2/2016 | King et al. | D99/28 |
| D749,000 S | 2/2016 | King et al. | D10/42 |
| D750,513 S | 3/2016 | King et al. | D10/70 |
| D755,649 S | 5/2016 | King et al. | D10/42 |
| D755,650 S | 5/2016 | King et al. | D10/42 |
| D756,807 S | 5/2016 | King et al. | D10/42 |
| D756,808 S | 5/2016 | King et al. | D10/42 |
| D762,040 S | 7/2016 | King et al. | D99/28 |
| 9,391,474 B2 | 7/2016 | Hunter et al. | H02J 9/06 |
| 2001/0012241 A1 | 8/2001 | Dee et al. | 368/90 |
| 2001/0047278 A1 | 11/2001 | Brookner et al. | 705/1 |
| 2001/0051531 A1 | 12/2001 | Singhal et al. | 455/556 |
| 2002/0008639 A1 | 1/2002 | Dee | 340/932.2 |
| 2002/0030606 A1 * | 3/2002 | Chauvin | G06Q 20/127 340/932.2 |
| 2002/0062172 A1 | 5/2002 | Bench et al. | 700/232 |
| 2002/0074344 A1 | 6/2002 | Long et al. | 222/71 |
| 2002/0080013 A1 | 6/2002 | Anderson, III et al. | 340/425.5 |
| 2002/0111768 A1 | 8/2002 | Ghorayeb et al. | 702/178 |
| 2002/0134645 A1 | 9/2002 | Alexander et al. | 194/351 |
| 2003/0017904 A1 | 1/2003 | Lee | 475/232 |
| 2003/0092387 A1 | 5/2003 | Hjelmvik | 455/41 |
| 2003/0112151 A1 | 6/2003 | Chauvin et al. | 340/870.02 |
| 2003/0112597 A1 | 6/2003 | Smith | 361/685 |
| 2003/0117904 A1 * | 6/2003 | Lank et al. | 368/90 |
| 2003/0121754 A1 | 7/2003 | King | 194/302 |
| 2003/0128010 A1 | 7/2003 | Hsu | 320/101 |
| 2003/0128136 A1 | 7/2003 | Spier et al. | 340/932.2 |
| 2003/0132840 A1 | 7/2003 | Bahar | 340/541 |
| 2003/0135407 A1 | 7/2003 | Reinhardt et al. | 705/13 |
| 2003/0140531 A1 | 7/2003 | Pippins | 37/456 |
| 2003/0144905 A1 | 7/2003 | Smith | 705/14 |

(56) References Cited

U.S. PATENT DOCUMENTS

| | | | |
|---|---|---|---|
| 2003/0144972 A1 | 7/2003 | Cordery et al. | 705/401 |
| 2003/0169183 A1 | 9/2003 | Korepanov et al. | 340/932.2 |
| 2003/0179107 A1 | 9/2003 | Kibria et al. | 340/932.2 |
| 2003/0220835 A1 | 11/2003 | Barnes, Jr. | 705/14 |
| 2003/0222792 A1* | 12/2003 | Berman | G07F 9/026 340/932.2 |
| 2003/0234888 A1 | 12/2003 | Hong et al. | 348/375 |
| 2004/0011099 A1 | 1/2004 | Andersson | 70/371 |
| 2004/0016796 A1 | 1/2004 | Hanna et al. | 235/375 |
| 2004/0039632 A1 | 2/2004 | Han et al. | 705/13 |
| 2004/0040028 A1 | 2/2004 | Moreau | 719/310 |
| 2004/0068434 A1 | 4/2004 | Kanekon | |
| 2004/0084278 A1 | 5/2004 | Harris et al. | 194/302 |
| 2004/0094619 A1 | 5/2004 | Silberberg | 235/382 |
| 2004/0160905 A1 | 8/2004 | Bernier et al. | 370/310 |
| 2004/0181496 A1 | 9/2004 | Odinotski et al. | 705/418 |
| 2004/0232878 A1 | 11/2004 | Couch et al. | 320/101 |
| 2004/0243526 A1 | 12/2004 | Krygler et al. | 705/418 |
| 2004/0254900 A1 | 12/2004 | Reinhard | 705/418 |
| 2004/0262379 A1 | 12/2004 | Gomes | 235/379 |
| 2004/0263117 A1 | 12/2004 | Kogan et al. | 320/114 |
| 2004/0264302 A1* | 12/2004 | Ward, II | G07B 15/02 368/90 |
| 2005/0029340 A1 | 2/2005 | Ferraro | 235/379 |
| 2005/0035740 A1 | 2/2005 | Elder et al. | 320/116 |
| 2005/0040951 A1 | 2/2005 | Zalewski et al. | 340/572.1 |
| 2005/0068201 A1 | 3/2005 | Wulff et al. | 341/20 |
| 2005/0155839 A1 | 7/2005 | Banks et al. | |
| 2005/0168352 A1 | 8/2005 | Tomer | 340/932.2 |
| 2005/0178639 A1 | 8/2005 | Brumfield et al. | 194/350 |
| 2005/0192911 A1 | 9/2005 | Mattern | 705/401 |
| 2006/0020487 A1 | 1/2006 | Spittel et al. | 705/1 |
| 2006/0021848 A1 | 2/2006 | Smith | 194/350 |
| 2006/0114159 A1* | 6/2006 | Yoshikawa et al. | 343/702 |
| 2006/0116972 A1 | 6/2006 | Wong | 705/418 |
| 2006/0136131 A1 | 6/2006 | Dugan et al. | 701/300 |
| 2006/0149684 A1 | 7/2006 | Matsuura et al. | 705/65 |
| 2006/0152349 A1 | 7/2006 | Ratnakar | 340/426.1 |
| 2006/0152385 A1 | 7/2006 | Mandy | 340/932.2 |
| 2006/0173733 A1 | 8/2006 | Fancher | 705/13 |
| 2006/0255119 A1 | 11/2006 | Marchasin et al. | 235/375 |
| 2006/0259354 A1 | 11/2006 | Yan | 705/13 |
| 2006/0267799 A1 | 11/2006 | Mendelson | 340/932.2 |
| 2007/0011700 A1 | 1/2007 | Johnson | 725/34 |
| 2007/0016539 A1 | 1/2007 | Groft et al. | 705/418 |
| 2007/0017265 A1 | 1/2007 | Andersson | 70/379 |
| 2007/0029825 A1 | 2/2007 | Franklin et al. | 340/937 |
| 2007/0044523 A1 | 3/2007 | Davis | 70/34 |
| 2007/0046651 A1 | 3/2007 | Sinclair et al. | 345/173 |
| 2007/0061155 A1 | 3/2007 | Ji et al. | 705/1 |
| 2007/0094153 A1 | 4/2007 | Ferraro | 705/67 |
| 2007/0114849 A1 | 5/2007 | Falik et al. | 307/64 |
| 2007/0119682 A1 | 5/2007 | Banks et al. | 705/418 |
| 2007/0129974 A1 | 6/2007 | Chen et al. | 705/5 |
| 2007/0136128 A1 | 6/2007 | Janacek et al. | 705/13 |
| 2007/0171069 A1 | 7/2007 | Allen | 340/572.1 |
| 2007/0184852 A1 | 8/2007 | Johnson et al. | 455/456.1 |
| 2007/0208499 A1 | 9/2007 | Kwong | 701/117 |
| 2007/0210935 A1 | 9/2007 | Yost et al. | 340/932.2 |
| 2007/0276724 A1 | 11/2007 | Catt | 705/13 |
| 2007/0285281 A1 | 12/2007 | Welch | 340/932.2 |
| 2008/0071611 A1 | 3/2008 | Lovett | 705/13 |
| 2008/0093454 A1 | 4/2008 | Yamazaki et al. | |
| 2008/0147268 A1 | 6/2008 | Fuller | 701/35 |
| 2008/0158010 A1 | 7/2008 | Nath et al. | 340/932.2 |
| 2008/0165030 A1 | 7/2008 | Kuo et al. | 340/932.2 |
| 2008/0208680 A1 | 8/2008 | Cho | 705/13 |
| 2008/0218383 A1 | 9/2008 | Franklin et al. | 340/937 |
| 2008/0238715 A1 | 10/2008 | Cheng et al. | |
| 2008/0245638 A1 | 10/2008 | King et al. | 194/350 |
| 2008/0257965 A1 | 10/2008 | Klein et al. | 235/483 |
| 2008/0265019 A1 | 10/2008 | Artino et al. | 235/379 |
| 2008/0266138 A1 | 10/2008 | Ponert | 340/932.2 |
| 2008/0270227 A1 | 10/2008 | Al Amri | 705/13 |
| 2008/0277468 A1 | 11/2008 | Mitschele | |
| 2008/0289030 A1 | 11/2008 | Poplett | 726/15 |
| 2008/0291054 A1 | 11/2008 | Groft | 340/932.2 |
| 2008/0296365 A1 | 12/2008 | Schliebe | 235/379 |
| 2008/0319837 A1 | 12/2008 | Mitschele | 705/13 |
| 2009/0026842 A1 | 1/2009 | Hunter et al. | 307/66 |
| 2009/0032368 A1 | 2/2009 | Hunter et al. | 194/318 |
| 2009/0049875 A1 | 2/2009 | Buhl et al. | 70/52 |
| 2009/0057398 A1 | 3/2009 | Douglass et al. | 235/379 |
| 2009/0083149 A1 | 3/2009 | Maekawa et al. | 705/14 |
| 2009/0095593 A1 | 4/2009 | King et al. | 194/302 |
| 2009/0099761 A1 | 4/2009 | Davis et al. | 701/120 |
| 2009/0102726 A1* | 4/2009 | Imano et al. | 343/702 |
| 2009/0109062 A1 | 4/2009 | An | 340/932.2 |
| 2009/0137204 A1 | 5/2009 | Chang | 455/41.1 |
| 2009/0159674 A1 | 6/2009 | King et al. | 235/382 |
| 2009/0183966 A1 | 7/2009 | King et al. | 194/217 |
| 2009/0192950 A1 | 7/2009 | King et al. | 705/418 |
| 2009/0199966 A1* | 8/2009 | Coleman et al. | 156/344 |
| 2009/0254438 A1 | 10/2009 | Johnson, Jr. et al. | 705/17 |
| 2009/0267732 A1* | 10/2009 | Chauvin | G06Q 20/32 340/5.53 |
| 2009/0284907 A1 | 11/2009 | Regimbal et al. | 361/679.02 |
| 2009/0287578 A1 | 11/2009 | Paluszek et al. | 705/17 |
| 2009/0315720 A1 | 12/2009 | Clement et al. | 340/573.5 |
| 2010/0019936 A1 | 1/2010 | Kaveler | 340/933 |
| 2010/0025459 A1 | 2/2010 | Yamada | 235/375 |
| 2010/0026522 A1 | 2/2010 | Ward, II | 340/932.2 |
| 2010/0030629 A1 | 2/2010 | Ward, II | 705/13 |
| 2010/0106517 A1 | 4/2010 | Kociubinski et al. | 705/2 |
| 2010/0153193 A1 | 6/2010 | Ashby et al. | 705/13 |
| 2010/0161489 A1 | 6/2010 | Goodall et al. | 705/45 |
| 2010/0187300 A1 | 7/2010 | Ramachandran et al. | 235/379 |
| 2010/0188932 A1 | 7/2010 | Hanks et al. | 367/140 |
| 2010/0241564 A1 | 9/2010 | Miller et al. | 705/43 |
| 2010/0243729 A1 | 9/2010 | Russell et al. | 235/379 |
| 2010/0328104 A1 | 12/2010 | Groft | 340/932.2 |
| 2010/0332394 A1 | 12/2010 | Ioli | 705/44 |
| 2011/0022427 A1 | 1/2011 | Dayan | 705/5 |
| 2011/0037562 A1 | 2/2011 | Braukmann et al. | |
| 2011/0057815 A1 | 3/2011 | King et al. | 340/932.2 |
| 2011/0060653 A1 | 3/2011 | King et al. | 705/14.58 |
| 2011/0063133 A1 | 3/2011 | Keller et al. | 340/932.2 |
| 2011/0066297 A1 | 3/2011 | Saberi et al. | 700/287 |
| 2011/0093314 A1 | 4/2011 | Redmann et al. | |
| 2011/0122036 A1 | 5/2011 | Leung et al. | |
| 2011/0133613 A1 | 6/2011 | Descamps et al. | 312/223.1 |
| 2011/0158331 A1 | 6/2011 | Kavaler et al. | 375/259 |
| 2011/0203901 A1 | 8/2011 | King et al. | 194/211 |
| 2011/0205087 A1 | 8/2011 | Kell et al. | 340/932.2 |
| 2011/0221624 A1 | 9/2011 | Kavaler | 342/22 |
| 2011/0261548 A1* | 10/2011 | Gandhi | 361/810 |
| 2011/0276519 A1 | 11/2011 | MacKay et al. | 705/418 |
| 2011/0313822 A1 | 12/2011 | Burdick | 705/13 |
| 2011/0320243 A1 | 12/2011 | Khan | 705/13 |
| 2012/0026015 A1 | 2/2012 | Kavaler | 340/933 |
| 2012/0158466 A1 | 6/2012 | John | 705/13 |
| 2012/0173171 A1 | 7/2012 | Bajwa et al. | 702/56 |
| 2012/0208521 A1 | 8/2012 | Hager et al. | 455/422.1 |
| 2012/0222935 A1 | 9/2012 | MacKay et al. | 194/210 |
| 2012/0273322 A1 | 11/2012 | MacKay et al. | 194/210 |
| 2012/0285790 A1 | 11/2012 | Jones et al. | 194/217 |
| 2012/0285791 A1 | 11/2012 | Jones et al. | 194/217 |
| 2012/0285792 A1 | 11/2012 | Jones et al. | 194/217 |
| 2012/0285793 A1 | 11/2012 | Jones et al. | 194/217 |
| 2012/0286036 A1 | 11/2012 | Jones et al. | 235/380 |
| 2012/0286968 A1 | 11/2012 | Jones et al. | 340/870.02 |
| 2012/0292385 A1 | 11/2012 | MacKay et al. | 235/375 |
| 2013/0005445 A1 | 1/2013 | Walker et al. | 463/25 |
| 2013/0027218 A1 | 1/2013 | Schwarz et al. | 340/870.02 |
| 2013/0085928 A1 | 4/2013 | McKinney | 705/39 |
| 2013/0099943 A1 | 4/2013 | Subramanya | 340/933 |
| 2013/0124270 A1 | 5/2013 | Tziperman et al. | 705/13 |
| 2013/0238406 A1 | 9/2013 | King et al. | 705/13 |
| 2013/0285455 A1 | 10/2013 | Hunter et al. | 307/66 |
| 2014/0040028 A1 | 2/2014 | King et al. | 705/14.53 |
| 2014/0058805 A1 | 2/2014 | Paesler et al. | 705/13 |
| 2014/0108107 A1 | 4/2014 | Jones et al. | 705/13 |
| 2014/0129158 A1 | 5/2014 | Shea | 702/57 |
| 2014/0172518 A1 | 6/2014 | King et al. | 705/13 |

(56) References Cited

U.S. PATENT DOCUMENTS

| | | | | |
|---|---|---|---|---|
| 2014/0174881 A1 | 6/2014 | King et al. | | 194/350 |
| 2014/0210646 A1 | 7/2014 | Subramanya | | 340/928 |
| 2014/0213176 A1 | 7/2014 | Mendelson | | 455/39 |
| 2014/0214499 A1 | 7/2014 | Hudson et al. | | 705/13 |
| 2014/0231505 A1 | 8/2014 | King et al. | | 235/375 |
| 2014/0279565 A1 | 9/2014 | Trump et al. | | 705/72 |
| 2014/0289025 A1 | 9/2014 | King et al. | | 705/13 |
| 2014/0319211 A1 | 10/2014 | MacKay et al. | | 235/380 |
| 2015/0084786 A1 | 3/2015 | King et al. | | 340/870.02 |
| 2015/0106172 A1 | 4/2015 | Salama | | G07F 17/246 |
| 2015/0235503 A1 | 8/2015 | King et al. | | G07F 17/248 |
| 2015/0332587 A1 | 11/2015 | Schwarz et al. | | G08G 1/017 |

FOREIGN PATENT DOCUMENTS

| | | | | |
|---|---|---|---|---|
| AU | 2006203554 | 9/2006 | | G07C 1/30 |
| AU | 314132 | 5/2007 | | |
| AU | 315845 | 8/2007 | | |
| AU | 315846 | 8/2007 | | |
| AU | 315847 | 8/2007 | | |
| CA | 2233931 | 4/1997 | | G08G 1/14 |
| CA | 2260925 | 1/1998 | | G07B 15/00 |
| CA | 2227833 | 7/1998 | | G07F 17/24 |
| CA | 2346908 | 4/2000 | | G07C 1/30 |
| CA | 2352968 | 1/2001 | | G07F 17/24 |
| CA | 2401429 | 9/2001 | | G07F 1/30 |
| CA | 2377010 | 12/2001 | | G06F 19/00 |
| CA | 2437722 | 8/2002 | | G08G 1/14 |
| CA | 2453369 | 1/2003 | | G07C 1/30 |
| CA | 2413198 | 5/2003 | | G07F 17/24 |
| CA | 2414132 | 6/2003 | | |
| CA | 2248347 | 10/2005 | | G07C 1/30 |
| CA | 2595309 | 7/2006 | | G08G 1/14 |
| CA | 2511461 | 2/2007 | | G07C 1/30 |
| CA | 2631699 | 6/2007 | | G06Q 10/00 |
| CA | 2622164 | 8/2008 | | G07F 17/24 |
| CA | 122930 | 9/2008 | | |
| CA | 126745 | 9/2008 | | |
| CA | 2693911 | 1/2009 | | G06Q 50/00 |
| CA | 2650192 | 7/2009 | | G08C 17/02 |
| CA | 2650195 | 7/2009 | | G01D 4/02 |
| CA | 2933066 | 7/2009 | | |
| CA | 2387540 | 4/2010 | | G07F 17/24 |
| CA | 134041 | 9/2010 | | |
| CA | 134042 | 9/2010 | | |
| CA | 2773132 | 3/2011 | | G06Q 30/00 |
| CA | 2773135 | 3/2011 | | G06Q 20/00 |
| CA | 2770093 | 5/2012 | | G07C 1/30 |
| CA | 2870592 | 5/2012 | | G07F 17/24 |
| CA | 2874155 | 5/2012 | | G07F 17/24 |
| CA | 155382 | 5/2015 | | |
| CA | 155383 | 5/2015 | | |
| CA | 155391 | 5/2015 | | |
| CA | 156990 | 5/2015 | | |
| CA | 156991 | 5/2015 | | |
| CA | 156992 | 5/2015 | | |
| CA | 156993 | 5/2015 | | |
| CA | 156994 | 5/2015 | | |
| CA | 156995 | 5/2015 | | |
| CA | 157067 | 5/2015 | | |
| CA | 157068 | 5/2015 | | |
| CA | 157069 | 5/2015 | | |
| CA | 161049 | 10/2015 | | |
| CA | 160598 | 2/2016 | | |
| CA | 163369 | 2/2016 | | |
| CA | 163370 | 2/2016 | | |
| CN | 2395344 | 9/2000 | | G07F 17/24 |
| CN | 2544352 | 4/2003 | | G06F 19/00 |
| CN | 1549990 | 11/2004 | | G07B 15/02 |
| DE | 28 04 085 A 1 | 2/1977 | | |
| DE | 27 50 193 C 2 | 11/1977 | | |
| DE | 102005041290 | 3/2007 | | G07B 15/02 |
| EP | 0329129 | 8/1989 | | G07F 17/24 |
| EP | 980055 | 2/2000 | | G07F 17/24 |
| EP | 1327962 | 7/2003 | | G07B 15/02 |
| EP | 1376491 | 1/2004 | | |
| EP | 1748393 | 1/2007 | | G07C 1/30 |
| EP | 1128350 | 10/2007 | | G07B 15/02 |
| EP | 1898360 | 3/2008 | | G07B 15/02 |
| EP | 2215605 | 8/2012 | | G07B 15/02 |
| GB | 1 237 579 | 12/1968 | | |
| GB | 1 283 555 | 10/1969 | | |
| GB | 1431862 | 4/1976 | | |
| GB | 2155228 | 9/1985 | | G09F 23/00 |
| GB | 2298510 | 9/1996 | | G07F 7/10 |
| JP | S58121494 | 7/1983 | | G07C 1/30 |
| JP | S6437661 | 2/1989 | | E04H 6/00 |
| JP | 01165494 | 6/1989 | | B42D 15/10 |
| JP | 01303026 | 12/1989 | | G11C 5/00 |
| JP | 0261711 | 3/1990 | | G06F 1/26 |
| JP | 0487533 | 3/1992 | | H02J 9/00 |
| JP | H08305998 | 11/1996 | | E04H 6/00 |
| JP | S5259000 | 5/1997 | | G07C 1/30 |
| JP | 2002074430 | 3/2002 | | G06Q 50/00 |
| JP | 2002099640 | 4/2002 | | G06Q 10/00 |
| JP | 2002528799 | 9/2002 | | G06Q 50/00 |
| JP | 2003527701 | 9/2003 | | G06Q 40/00 |
| JP | 2005242888 | 9/2005 | | G06Q 10/00 |
| JP | 2005267430 | 9/2005 | | G06Q 10/00 |
| JP | 2007052773 | 3/2007 | | G07F 17/24 |
| JP | 2011060206 | 3/2011 | | G07B 15/00 |
| KR | 20000016671 | 3/2000 | | G07F 17/24 |
| KR | 20010028481 | 4/2001 | | G07B 1/00 |
| KR | 20050038077 | 4/2005 | | G07B 5/12 |
| KR | 1020080026282 | 3/2008 | | G06F 19/00 |
| KR | 20080041730 | 5/2008 | | G06T 7/20 |
| MX | 2008007047 | 8/2008 | | G06Q 10/00 |
| NZ | 530606 | 11/2006 | | G07C 1/30 |
| WO | WO 81/00778 | 3/1981 | | |
| WO | WO9611453 | 4/1996 | | G07C 1/30 |
| WO | 97/12345 | 4/1997 | | |
| WO | WO9737328 | 10/1997 | | G07B 15/02 |
| WO | WO98/04080 | 1/1998 | | H04M 15/00 |
| WO | WO0059201 | 10/2000 | | H04M 15/00 |
| WO | WO01/69541 | 9/2001 | | G07F 17/24 |
| WO | WO0180157 | 10/2001 | | G06F 19/00 |
| WO | WO02063570 | 8/2002 | | |
| WO | WO03009238 | 1/2003 | | G07C 1/30 |
| WO | WO2004012352 | 2/2004 | | H04B 1/38 |
| WO | WO2005031494 | 4/2005 | | |
| WO | WO2006076773 | 7/2006 | | G08G 1/14 |
| WO | WO2007063530 | 6/2007 | | G06Q 10/00 |
| WO | WO2009009854 | 1/2009 | | G06Q 50/00 |
| WO | WO2010071974 | 7/2010 | | G07C 1/30 |
| WO | WO2012154902 | 11/2012 | | G07F 17/14 |
| WO | WO2012154913 | 11/2012 | | G06Q 50/30 |
| WO | WO2014014494 | 1/2014 | | G07B 15/02 |

OTHER PUBLICATIONS

International Search Report dated Feb. 17, 2010 (PCT/CA2009/001657) (2 pgs).

International Search Report, PCT/CA2009/001058, dated Nov. 12, 2009 (4 pgs).

International Search Report, PCT/US2010/047907, dated Apr. 26, 2011 (3 pgs).

International Search Report, PCT/US2010/047906, dated Mar. 30, 2011 (3 pgs).

International Search Report, PCT/IB06/054574, dated Oct. 27, 2008 (2 pgs).

Office Action, dated Dec. 13, 2011 in U.S. Appl. No. 12/973,109 (27 pgs).

Office Action, dated Sep. 14, 2011 in U.S. Appl. No. 12/430,733 (7 pgs).

Office Action, dated Dec. 7, 2011 in U.S. Appl. No. 12/355,734 (31 pgs).

Office Action, dated Sep. 15, 2011 in U.S. Appl. No. 12/355,740 (6 pgs).

Office Action, dated Dec. 20, 2011 in U.S. Appl. No. 12/355,740 (12 pgs).

Office Action, dated Jun. 29, 2011 in U.S. Appl. No. 12/059,909 (21 pgs).

(56) References Cited

OTHER PUBLICATIONS

Office Action, dated Jul. 27, 2011 in U.S. Appl. No. 12/059,909 (34 pgs).
Office Action, dated Apr. 11, 2011 in U.S. Appl. No. 12/095,914 (3 pgs).
Request for Continued Examination, dated Sep. 27, 2011 in U.S. Appl. No. 12/059,909 (18 pgs).
Request for Continued Examination, dated Mar. 30, 2012 in U.S. Appl. No. 12/355,734 (32 pgs).
(Cell Net Data Systems) "First Wireless Monitoring of Parking Meters Results in Theft Arrests Using CellNet Data Systems Technology," PRNewswire, May 11, 1999 (2 pgs).
StreetSmart Technology, LLC, "Technical Specifications and System Features for the StreetSmart Solution" Brochure (8 pgs).
Meter Solutions, Single-Space Meters brochure, downloaded from www.duncansolutions.com website, revised Apr. 2006 (2 pgs).
Anonymous, "The Originators of Metered Parking, Series II, APM-E Mechanism, Service Manual," POM Incorporated, May 23, 2006 revision (22 pgs).
POM APM Solar Powered Meter advertisements, undated (5 pgs).
POM APM photographs (33 pgs).
Byrd, Dennis, "City officials plug solar-powered parking meters, Electronic eye ends free parking," Lawrence Journal World, Apr. 30, 1989, p. 11C (1 pg).
Byrd, Dennis, Parking Meter Manufacturer Sees Bright Future for New Sun-Powered Devices, Los Angeles Times, May 14, 1989 (2 pgs).
International Preliminary Report on Patentability, issued for application No. PCT/US2010/047907, dated Mar. 15, 2012 (6 pgs).
International Preliminary Report on Patentability, issued for application No. PCT/US2010/047906, dated Mar. 6, 2012 (5 pgs).
International Preliminary Report on Patentability, issued for application No. PCT/IB2006/054574, dated Mar. 10, 2009 (5 pgs).
Office Action issued for U.S. Appl. No. 12/973,109, dated Apr. 30, 2012 (24 pgs).
Office Action issued for U.S. Appl. No. 12/355,734, dated Apr. 6, 2012 (36 pgs).
Information Disclosure Statement by Applicant filed for U.S. Appl. No. 12/355,734 on May 23, 2012 (22 pgs).
Information Disclosure Statement by Applicant filed for U.S. Appl No. 12/355,740 on May 23, 2012 (25 pgs).
Information Disclosure Statement by Applicant filed for U.S. Appl. No. 12/875,959 on May 24, 2012 (22 pgs).
Information Disclosure Statement by Applicant filed for U.S. Appl No. 12/875,975 on May 24, 2012 (22 pgs).
Request for Continued Examination (RCE) and Information Disclosure Statement by Applicant filed for U.S. Appl. No. 12/973,109 on May 31, 2012 (43 pgs).
Canadian Office Action issued for related application No. 2,745,365, dated Jul. 4, 2012 (2 pgs).
Canadian Office Action issued for related application No. 2,745,365, dated Jun. 5, 2012 (2 pgs).
Canadian Office Action issued for related application No. 2,745,365, dated Aug. 26, 2011 (4 pgs).
Canadian Office Action issued for related application No. 2,745,365, dated Mar. 1, 2012 (6 pgs).
Office Action issued in related U.S. Appl. No. 08/959,109, dated Nov. 21, 2012 (24 pgs).
Office Action issued in related U.S. Appl. No. 13/545,871, dated Nov. 28, 2012 (30 pgs).
Office Action issued in related U.S. Appl. No. 12/973,109, dated Jan. 28, 2013 (19 pgs).
Office Action issued in related U.S. Appl. No. 13/545,871, dated Dec. 28, 2012 (7 pgs).
Office Action issued in related U.S. Appl. No. 13/410,831, dated Feb. 12, 2013 (20 pgs).
Information Disclosure Statement by Applicant filed Oct. 23, 2012 for U.S. Appl. No. 12/355,734 (2 pgs).
Office Action issued for related U.S. Appl. No. 13/546,918, dated Sep. 26, 2012 (26 pgs).
Canadian Office Action issued for related application No. 2,770,093, dated Jul. 5, 2012 (5 pgs).
International Search Report & Written Opinion, PCT/CA12/000191, dated Jun. 20, 2012 (8 pgs).
Office Action issued for related U.S. Appl. No. 13/410,831, dated Nov. 6, 2012 (46 pgs).
Canadian Office Action issued in application No. 2,745,368, dated Aug. 4, 2011 (2 pgs).
Canadian Office Action issued in application No. 2,745,368, dated Nov. 1, 2011 (3 pgs).
Canadian Office Action issued in application No. 2,770,093, dated Apr. 10, 2013 (2 pgs).
Canadian Office Action issued in application No. 2,770,093, dated Jun. 11, 2014 (2 pgs).
Canadian Office Action issued in application No. 2,770,093, dated Oct. 15, 2014 (3 pgs).
Canadian Office Action issued in application No. 2,770,093, dated Oct. 29, 2012 (2 pgs).
Canadian Office Action issued in application No. 2,773,250, dated Mar. 26, 2015 (10 pgs).
Canadian Office Action issued in application No. 2,773,250, dated Jun. 20, 2013 (3 pgs).
Canadian Office Action issued in application No. 2,773,250, dated Jun. 30, 2014 (3 pgs).
Canadian Office Action issued in application No. 2,773,250, dated Mar. 12, 2014 (5 pgs).
Canadian Office Action issued in application No. 2,773,250, dated Nov. 12, 2014 (10 pgs).
Canadian Office Action issued in application No. 2,773,250, dated Oct. 7, 2013 (4 pgs).
Office Action issued in U.S. Appl. No. 14/325,134, dated Apr. 1, 2015 (46 pgs).
Office Action issued in related U.S. Appl. No. 08/418,018, dated Jul. 25, 1997 (6 pgs).
Office Action issued in related U.S. Appl. No. 08/418,018, dated Jan. 17, 1997 (11 pgs).
Office Action issued in related U.S. Appl. No. 08/959,109, dated May 25, 2012 (4 pgs).
Office Action issued in related U.S. Appl. No. 08/959,109, dated Aug. 5, 2011 (7 pgs).
Office Action issued in related U.S. Appl. No. 08/959,109, dated Apr. 1, 2011 (8 pgs).
Office Action issued in related U.S. Appl. No. 08/959,109, dated Jan. 26, 1998 (9 pgs).
Office Action issued in related U.S. Appl. No. 13/546,918, dated May 8, 2014 (22 pgs).
Office Action issued in related U.S. Appl. No. 13/546,918, dated Dec. 5, 2013 (23 pgs).
Office Action issued in related U.S. Appl. No. 13/410,831, dated Jul. 12, 2013 (7 pgs).
Flatley, J., "In San Francisco, hackers park for free," posted Jul. 31, 2009, www.engadget.com (1 pg).
Howland, S., "How M2M Maximizes Denver's Revenue," FieldTechnologiesOnline.com, Oct. 2011, pp. 9-12 (4 pgs).
The United States Conference of Mayors Press Release, "The U.S. Conference of Mayors Presents 'Best-Practice' Awards," Jan. 20, 2012, (3 pgs).
Notice of Allowance issued in related U.S. Appl. No. 29/489,572 dated Jun. 11, 2014 (10 pgs).
Office Action issued in related U.S. Appl. No. 13/545,871, dated Aug. 6, 2013 (39 pgs).
International Preliminary Report on Patentability issued in related application No. PCT/CA2012/000191, dated Sep. 12, 2013 (7 pgs).
Office Action issued in related U.S. Appl. No. 13/529,914, dated Sep. 27, 2013 (18 pgs).
Notice of Allowance issued in related U.S. Appl. No. 13/410,831, dated Oct. 11, 2013 (33 pgs).
Office Action issued in related U.S. Appl. No. 13/141,983, dated Oct. 22, 2013 (47 pgs).
Office Action issued in related U.S. Appl. No. 14/094,382, dated Aug. 5, 2014 (47 pgs).
Notice of Allowance issued in related U.S. Appl. No. 29/433,549, dated Feb. 27, 2014 (60 pgs).

(56) References Cited

OTHER PUBLICATIONS

Remedios et al., "NFC Technologies in Mobile Phones and Emerging Applications," 2006, IFIP International Federation for Information Processing, vol. 220, Information Technology for Balanced Manufacturing Systems, ed. Shen, W., (Boston: Springer, pp. 425-434 (10 pgs).
Burden et al., "Near Field Communications (NFC) in Public Transport," Digital Identity Forum, 2006 (18 pgs).
Basu et al., "Networked Parking Spaces: Architecture and Applications," MCL Technical Report No. 07-01-2002, Proc. IEEE Vehicular Transportation Conference, Vancouver, Canada, Sep. 2002 (10 pgs).
Bayless et al., "Smart Parking and the Connected Consumer," ITS America Research, Dec. 2012 (39 pgs).
Bernspång, F., "Smart Parking using Magnetometers and Mobile Applications," Master's Thesis, Master of Science in Engineering Technology, Computer Science and Engineering, Luleá University of Technology, Nov. 2010-May 2011 (35 pgs).
Cosgrove, D., "SmartPark," Senior Project Report, Jun. 12, 2013 (20 pgs).
Notice of Allowance issued in U.S. Appl. No. 13/546,918, dated Feb. 26, 2015 (24 pgs).
Office Action issued in U.S. Appl. No. 14/094,382, dated Mar. 24, 2015 (16 pgs).
Shaheen, S., "Smart Parking Management Field Test: A Bay Area Rapid Transit (BART) District Parking Demonstration," Institute of Transportation Studies, UC Davis, Jan. 1, 2005 (139 pgs).
DAT Self-Service System Limited, Product Brochure, Version 1.0, Date: May 2005, pp. 1-39 (39 pgs), plus English translation (42 pgs).
Notice of Allowance issued in related U.S. Appl. No. 13/545,871, dated Dec. 16, 2013 (22 pgs).
Office Action issued in related U.S. Appl. No. 14/094,382, dated Dec. 26, 2014 (25 pgs).
Fidelman, C., "Time's running out for parking meters at present locations: $270,000 cited as replacement cost. City employees who ticket motorists find electronic meters unsuitable," The Gazette, Final Edition, Montreal, Quebec, Canada, Nov. 12, 2002, p. A7 (2 pgs).
International Search Report issued in related application No. PCT/CA2007/001266, dated Apr. 21, 2008 (3 pgs).
Supplementary European Search Report issued in related application No. EP07784953, dated Jul. 1, 2010 (1 pg).
Office Action issued in U.S. Appl. No. 14/325,134, dated Jul. 21, 2015 (28 pgs).
Barefoot, D., "There'll be lies, there'll be tears, a jury of your peers," DarrenBarefoot.com: Dec. 2005, pp. 8-9 (39 pages).
Canadian Office Action issued in application No. 2,870,544, dated Jan. 19, 2015 (5 pgs).
Cardinal Tracking Inc.—MobileCite brochure, undated (2 pgs).
Digital Payment Technologies—LUKE brochure, undated (4 pgs).
Digital Payment Technologies—LUKE website, https://web.archive.org/web/20061025094839/http:www.digitalpaytech.com/luke.html, Oct. 25, 2006 (5 pgs).
*Duncan Parking Technologies, Inc.* v. *IPS Group Inc.*, Petition for Inter Partes Review of U.S. Pat. No. 7,854,310, IPR2016-00067, Oct. 22, 2015 (66 pgs).
*Duncan Parking Technologies, Inc.* v. *IPS Group Inc*., Petition for Inter Partes Review of U.S. Pat. No. 7,854,310, IPR2016-00068, Oct. 22, 2015 (64 pgs).
*Duncan Parking Technologies, Inc.* v. *IPS Group Inc.*, Petition for Inter Partes Review of U.S. Pat. No. 8,595,054, IPR2016-00069, Oct. 22, 2015 (67 pgs).
*Duncan Parking Technologies, Inc.* v. *IPS Group Inc.*, Petition for Inter Partes Review of U.S. Pat. No. 8,595,054, IPR2016-00070, Oct. 22, 2015 (61 pgs).
Duncan Solutions—AutoCITE brochure, 2013 (2 pgs).
Duncan Solutions—Eagle 2100 brochure, 2013 (2 pgs).
Duncan Solutions—Eagle CK brochure, 2013 (2 pgs).
Duncan Solutions—Intermec CN50 webpage, Mar. 8, 2011 (2 pgs).
Duncan Solutions—Motorola MC75 webpage, Mar. 8, 2011 (2 pgs).
Duncan Solutions—VM Pay-by-Space Multi-Space Meter brochure, 2013 (2 pgs).
Exhibit 1003—Declaration of Todd Magness in Support of Petition for Inter Partes Review of U.S. Pat. No. 7,854,310, dated Oct. 21, 2015 (70 pgs).
Exhibit 1004—Declaration of Anderson Moore in Support of Petition for Inter Partes Review of U.S. Pat. No. 8,595,054, dated Oct. 21, 2015 (19 pgs).
Exhibit 1005—U.S. Appl. No. 60/741,920, filed Dec. 2, 2005 (20 pgs).
Exhibit 1009—Tung, Y., "Design of an Advanced On-street Parking Meter," Thesis, Rochester Institute of Technology, 2001 (25 pgs).
Exhibit 1010—Christian, S.E., "Parking Meter Winding Up for Computer Age," Chicago Tribune, May 19, 1995 (6 pgs).
Exhibit 1011—Associated Press, "New parking meters based on computer," The San Diego Union, Feb. 1, 1987 (1 pg).
Exhibit 1012—Lunden, J., Good Morning America transcript, Nov. 6, 1986 (3 pgs).
Exhibit 1013—LUKE Parking Station ad (p. 28), Parking Today, vol. 10, No. 4, Apr. 2005 (64 pgs).
Exhibit 1014—Blass, E., "Changing times," Lansing State Journal, Feb. 19, 1987 (1 pg).
Exhibit 1015—Gabriele, M.C., "Electronic Parking Meters Rival Mechanical Units," American Metal Market/Metalworking News, Sep. 29, 1986 (1 pg).
Exhibit 1016—Sandler, L., "Lovely VISA, meter maid: Use credit card to park," Milwaukee Journal Sentinel, Jun. 13, 2005 (1 pg).
Exhibit 1017—Item for Finance Committee, "Capital Works Reserve Fund, Head 708—Capital Subventions and Major Systems and Equipment," FCR(2002-03)18, May 24, 2002 (15 pgs).
Exhibit 1018—Anonymous, "Happy %#@! Anniversary, First Parking Meter Installed Jul. 16, 1935," The Expired Meter News, Views, Information on Driving in Chicago, Jul. 16, 2009 (10 pgs).
Exhibit 1019—Anonymous, Parking Meter Patented 72 Years Ago Today, The Expired Meter News, Views, Information on Driving in Chicago, May 24, 2010 (6 pgs).
Exhibit 1020—U.S. Pat. No. 2,118,318 to Magee, May 24, 1938 (11 pgs).
Exhibit 1032—U.S. Pat. No. 5,570,771 to Jacobs, Nov. 5, 1996 (29 pgs).
Exhibit 1034—Anonymous, "Smart Cards and Parking," TC-06001, Smart Card Alliance Transportation Council White Paper, Jan. 2006 (52 pgs).
Exhibit 1037—Catalog Entry for Exhibit 1009, Tung, Y., "Design of an advanced on-street parking meter," Oct. 18, 2015 (2 pgs).
Exhibit 1038—POM Parking Meters website, Oct. 20, 2015 (4 pgs).
International Search Report issued in application No. PCT/US2012/037229, dated Jan. 28, 2013 (6 pgs).
International Search Report issued in application No. PCT/US2012/037205, dated Oct. 4, 2012 (3 pgs).
Notice of Allowance issued in U.S. Appl. No. 13/546,918, dated Nov. 20, 2015 (12 pgs).
Notice of Allowance issued in U.S. Appl. No. 14/325,134, dated Feb. 3, 2016 (14 pgs).
Notice of Allowance issued in U.S. Appl. No. 29/477,339, dated Apr. 1, 2015 (3 pgs).
Notice of Allowance issued in U.S. Appl. No. 29/477,402, dated Aug. 3, 2015 (3 pgs).
Notice of Allowance issued in U.S. Appl. No. 29/477,405, dated Apr. 1, 2015 (10 pgs).
Office Action issued in U.S. Appl. No. 14/325,134, dated Nov. 24, 2015 (22 pgs).
Office Action issued in U.S. Appl. No. 14/698,806, dated Dec. 14, 2015 (9 pgs).
Office Action issued in U.S. Appl. No. 29/477,200, dated Apr. 9, 2015 (9 pgs).
Office Action issued in U.S. Appl. No. 29/477,201, dated Apr. 9, 2015 (9 pgs).
Office Action issued in U.S. Appl. No. 29/477,204, dated Apr. 9, 2015 (9 pgs).
Office Action issued in U.S. Appl. No. 29/477,321, dated May 15, 2015 (9 pgs).

(56) References Cited

OTHER PUBLICATIONS

Office Action issued in U.S. Appl. No. 29/477,324, dated Apr. 23, 2015 (9 pgs).
Office Action issued in U.S. Appl. No. 29/477,329, dated May 22, 2015 (11 pgs).
Office Action issued in U.S. Appl. No. 29/477,402, dated Apr. 9, 2015 (15 pgs).
Photo Violation Technologies—Revolutionizing the Industry by Perfecting How People Park, https://web.archive.org/web/20070628195927/http://www.photoviolation.com/, Jun. 28, 2007 (50 pgs).
Photo Violation Technologies Corp.—Products, Oct. 2, 2015 (3 pgs).
Spyker, R.L., "Predicting capacitor run time for a battery/capacitor hybrid source," Power Electronic Drives and Energy Systems for Industrial Growth, 1998, abstract only (2 pgs).
Transcript & Screenshots of https://web.archive.org/web/20080222104246/http://www.photoviolation.com/videos/PCM. wmv, Photo Violation Technologies Corp.—"ParkCardMeter™ System," undated (6 pgs).
Transcript & Screenshots of https://web.archive.org/web/20080222104246/http://www.photoviolation.com/videos/HHU. wmv, Photo Violation Technologies Corp.— "PhotoViolationHandHeldUnit™," undated (7 pgs).
Transcript & Screenshots of https://web.archive.org/web/20080222104246/http://www.photoviolation.com/videos/PBS. wmv, Photo Violation Technologies Corp.—"The PBS Solution," undated (10 pgs).
Transcript & Screenshots of https://web.archive.org/web/20080222104246/http://www.photoviolation.com/videos/PVM. wmv, Photo Violation Technologies Corp.—"The PVM Solution," undated (17 pgs).
Video link, "ParkCardMeter™ System," https://web.archive.org/web/20080222104246/http://www.photoviolation.com/videos/PCM.wmv, Photo Violation Technologies Corp., undated.
Video link, "PhotoViolationHandHeldUnit™," https://web.archive.org/web/20080222104246/http://www.photoviolation.com/videos/HHU.wmv, Photo Violation Technologies Corp., undated.
Video link, "The PBS Solution," https://web.archive.org/web/20080222104246/http://www.photoviolation.com/videos/PBS.wmv, Photo Violation Technologies Corp., undated.
Video link, "The PVM Solution," https://web.archive.org/web/20080222104246/http://www.photoviolation.com/videos/PVM.wmv, Photo Violation Technologies Corp., undated.
Written Opinion issued in application No. PCT/US2012/037205, dated Oct. 4, 2012 (5 pgs).
Written Opinion issued in application No. PCT/US2012/037229, dated Jan. 28, 2013 (6 pgs).
Notice of Allowance issued in U.S. Appl. No. 13/546,918, dated Jun. 19, 2015 (13 pgs).
Digital Payment Technologies, Credit Card Processing with LUKE and SHELBY, Dec. 2007 (15 pgs).
Digital Payment Technologies, Digital Payment Technologies and PXT Payments Forge Partnership to Bring Cities Smart Parking Meters and Merchant Loyalty Debit Cards, www.digitalpaytech.com, Apr. 27, 2010 (2 pgs).
Digital Payment Technologies, Request for Proposal #B09030—Parking Pay Stations, City of Dover, New Hampshire, Oct. 22, 2008 (part 1—110 pgs).
Digital Payment Technologies, Request for Proposal #B09030—Parking Pay Stations, City of Dover, New Hampshire, Oct. 22, 2008 (part 2—160 pgs).
Digital Payment Technologies, Request for Proposal for Multi-Space Parking Meters, City of Fort Lauderdale, Jan. 13, 2010 (89 pgs).
Digital Payment Technologies, Sierra Wireless Case Study, Dec. 7, 2009 (2 pgs).
Digital Payment Technologies, Technologies Launches LUKE II Multi-Space Parking Pay Station, May 16, 2011 (3 pgs).

*Duncan Parking Technologies, Inc.* v. *IPS Group Inc.*, Case IPR2016-00068, Decision, Mar. 30, 2016 (13 pgs).
*Duncan Parking Technologies, Inc.* v. *IPS Group Inc.*, Case IPR2016-00070, Decision, Apr. 1, 2016 (17 pgs).
*Duncan Parking Technologies, Inc.* v. *IPS Group Inc.*, Case IPR2016-00069, Decision, Apr. 1, 2016 (13 pgs).
*Duncan Parking Technologies, Inc.* v. *IPS Group Inc.*, Case IPR2016-00067, Decision, Mar. 30, 2016 (19 pgs).
*Duncan Parking Technologies, Inc.* v. *IPS Group Inc.*, Case IPR2016-00067, Preliminary Response, Jan. 29, 2016 (38 pgs).
*Duncan Parking Technologies, Inc.* v. *IPS Group Inc.*, Case IPR2016-00068, Patent Owner's Preliminary Response, Feb. 1, 2016 (48 pgs).
*Duncan Parking Technologies, Inc.* v. *IPS Group Inc.*, Case IPR2016-00069, Patent Owner's Preliminary Response, Feb. 1, 2016 (48 pgs).
*Duncan Parking Technologies, Inc.* v. *IPS Group Inc.*, Case IPR2016-00070, Preliminary Response, Feb. 1, 2016 (49 pgs).
*Duncan Parking Technologies, Inc.* v. *IPS Group Inc.*, Case IPR2016-00067, Patent Owner's Mandatory Notices, Nov. 6, 2015 (4 pgs).
*Duncan Parking Technologies, Inc.* v. *IPS Group Inc.*, Case IPR2016-00067, Scheduling Order, Mar. 30, 2016 (9 pgs).
Duncan Solutions, AutoCITE™ X3 Handheld Computer, 2013 (2 pgs).
Duncan Solutions, Duncan VS, 2006 (2 pgs).
Duncan Solutions, Pay-by-Space Parking Meters, Customer Support Manual, Jul. 2006 (part 1—113 pgs).
Duncan Solutions, Pay-by-Space Parking Meters, Customer Support Manual, Jul. 2006 (part 2—103 pgs).
Duncan Solutions/Reino, RSV3 Digital Parking Meter, Jul. 5, 2011 (2 pgs).
Duncan, Duncan VM-Solar Power meter photograph, pre-Mar. 2011 (1 pg).
International Search Report issued in application No. PCT/US2013/021201, dated Apr. 30, 2013 (3 pgs).
Intrinsync Software International, Inc., Intrinsyc and Digital Pioneer Partner on Development of New Leading Edge Parking Terminal Solution, Aug. 14, 2003 (2 pgs).
IPS Group Inc., Exhibit 2001, Design of an advanced on-street parking meter, Jan. 12, 2016 (2 pgs).
IPS Group Inc., Exhibit 2002, About RIT Digital Media Library, Jan. 12, 2016 (1 pg).
IPS Group Inc., Exhibit 2003, The U.S. Conference of Mayors Presents 'Best-Practice' Awards, Jan. 20, 2012 (2 pgs).
IPS Group Inc., Exhibit 2004, City of Los Angeles, Card & Coin Parking Meter Lease, Nov. 29, 2010 (4 pgs).
IPS Group Inc., Exhibit 2005, City of Culver City, California, Approval of a Contract with IPS Group Inc., for the Sole-Source Purchase of 1,000 Parking Meters, Dec. 12, 2011 (3 pgs).
IPS Group Inc., Exhibit 2006, City of San Luis Obispo City Manager Report, Award of Credit Card Meters and Service Contract, RFP Specification No. 91137, Jan. 20, 2012 (5 pgs).
IPS Group Inc., Exhibit 2007, Walnut Creek, Alternate Downtown Parking Pay Technology, Oct. 20, 2011 (4 pgs).
IPS Group Inc., Exhibit 2008, How M2M Maximizes Denver's Revenue, Oct. 2011 (4 pgs).
IPS Group Inc., Exhibit 2009, Somerville, MA, T&P Introduces User-Friendly Parking Meters & Service Upgrades with Electronic Meter Pilot, Apr. 19, 2011 (2 pgs).
Kienzle, meter photograph, pre-Mar. 2011 (1 pg).
Notice of Allowance issued in U.S. Appl. No. 13/546,918, dated Mar. 28, 2016 (29 pgs).
Notice of Allowance issued in U.S. Appl. No. 14/325,134, dated Apr. 28, 2016 (19 pgs).
Notice of Allowance issued in U.S. Appl. No. 14/743,691, dated May 13, 2016 (62 pgs).
Office Action issued in U.S. Appl. No. 29/477,176, dated May 4, 2015 (16 pgs).
Office Action issued in U.S. Appl. No. 29/477,200, dated Apr. 9, 2015 (13 pgs).
Office Action issued in U.S. Appl. No. 29/477,201, dated Apr. 9, 2015 (11 pgs).

(56) References Cited

OTHER PUBLICATIONS

Office Action issued in U.S. Appl. No. 29/477,204, dated Apr. 9, 2015 (13 pgs).
Office Action issued in U.S. Appl. No. 29/477,402, dated Apr. 9, 2015 (19 pgs).
Reino International, Recommended Cashbox Handling Guidelines, Version 2.0, Nov. 26, 2003 (7 pgs).
Reino Meter Advertisement, The power of a paystation, Parking Today, Aug. 2003 (1 pg).
Reino Parking Systems: On-Street Service Procedures, Jun. 29, 2004 (19 pgs).
Reino, Operator User Manual, 2003 (106 pgs).
Reino, Parking Systems RSV2 Service Manual, Version 3.1, Dec. 2003 (78 pgs).
Reino, RSV3 brochure, Nov. 10, 2007 (4 pgs).
Bridge IR Group, Inc., Changing the Way the World Pays for On-Street Parking, Research Report, United States-Technology Processing Systems/Products, Dec. 6, 2006 (23 pgs).
IPS Multi Bay Parking Meter product description, http://www.design-industry.com.au/work/multi-bay-parking-meter/, Oct. 6, 2015 (6 pgs).
Canadian Office Action issued in application No. 2,870,544, dated Oct. 15, 2015 (6 pgs).
IPS Single Bay Parking Meter product description, http://www.design-industry.com.au/work/ips-single-parking-meter/, Oct. 6, 2015 (6 pgs).
Photo Violation Technologies—Revolutionizing the Industry by Perfecting How People Park, https://web.archive.org/web/20060813094459/http://photoviolation.com/, Aug. 13, 2006 (65 pgs).
Photo Violation Technologies—Revolutionizing the Industry by Perfecting How People Park, https://web.archive.org/web/20060823100739/http://photoviolation.com/, Aug. 23, 2006 (65 pgs).
Photo Violation Technologies—Revolutionizing the Industry by Perfecting How People Park, https://web.archive.org/web/20080222104246/http://photoviolation.com/, Feb. 22, 2008 (47 pgs).
Photo Violation Technologies—Revolutionizing the Industry by Perfecting How People Park, https://web.archive.org/web/20060110041849/http://photoviolation.com/, Jan. 10, 2006 (57 pgs).
Photo Violation Technologies—Revolutionizing the Industry by Perfecting How People Park, https://web.archive.org/web/20060715195511/http://photoviolation.com/, Jul. 15, 2006 (49 pgs).
Photo Violation Technologies Corp. Press Releases, Jul. 18, 2005-Jan. 17, 2006 (9 pgs).
Photo Violation Technologies Corp., https://web.archive.org/web/20131118213440/http://photoviolationmeter.com/, Nov. 18, 2013 (8 pgs).
Photo Violation Technologies Corp., https://web.archive.org/web/20040401225217/http://photoviolationmeter.com/, Apr. 1, 2004 (50 pgs).
PhotoViolationMeter pamphlet (undated) 2 pgs).
The Patented PhotoViolationMeter Solution book view (undated) (12 pgs).
The PhotoViolationMeter Case Study, Photo Violation Technologies Corp., Dec. 15, 2015 (4 pgs).
YouTube video, "The PhotoViolationMeter TM" https://www.youtube.com/watch?v=YEFuebnwn_Y, Dec. 15, 2006 (2 pgs).
U.S. Appl. No. 08/959,109, filed Oct. 23, 1997.
U.S. Appl. No. 10/317,414, filed Dec. 12, 2002.
U.S. Appl. No. 12/430,733, filed Apr. 27, 2009.
U.S. Appl. No. 12/788,100, filed May 26, 2010.
U.S. Appl. No. 13/141,983, filed Jun. 23, 2011.
U.S. Appl. No. 13/410,831, filed Mar. 2, 2012.
U.S. Appl. No. 13/454,976, filed Apr. 24, 2012.
U.S. Appl. No. 13/529,914, filed Jun. 21, 2012.
U.S. Appl. No. 13/545,871, filed Jul. 10, 2012.
U.S. Appl. No. 13/546,918, filed Jul. 11, 2012.
U.S. Appl. No. 29/367,429, filed Aug. 6, 2010.
U.S. Appl. No. 29/367,431, filed Aug. 6, 2010.
U.S. Appl. No. 29/391,605, filed May 11, 2011.
U.S. Appl. No. 29/410,857, filed Jan. 12, 2012.
U.S. Appl. No. 29/433,549, filed Oct. 1, 2012.
U.S. Appl. No. 61/048,133, filed Apr. 25, 2008.
U.S. Appl. No. 61/140,543, filed Dec. 23, 2008.
U.S. Appl. No. 13/782,818, filed Mar. 1, 2013.
U.S. Appl. No. 14/094,382, filed Dec. 2, 2013.
U.S. Appl. No. 29/489,572, filed Apr. 30, 2014.
U.S. Appl. No. 14/325,134, filed Jul. 7, 2014.
U.S. Appl. No. 14/743,691, filed Jun. 18, 2015.
U.S. Appl. No. 14/864,170, filed Sep. 24, 2015.
U.S. Appl. No. 13/546,918, filed Jul. 11, 2012, MacKay et al.
U.S. Appl. No. 14/325,134, filed Jul. 7, 2014, MacKay et al.
U.S. Appl. No. 14/743,691, filed Jun. 18, 2015, MacKay et al.
U.S. Appl. No. 14/864,170, filed Sep. 24, 2015, MacKay et al.
Office Action issued in U.S. Appl. No. 13/468,881, dated Sep. 4, 2013 (13 pgs).
Office Action issued in U.S. Appl. No. 29/455,221, dated Jan. 13, 2014 (10 pgs).
*Duncan Parking Technologies, Inc. vs. IPS Group Inc.*, Patent Owner's Preliminary Response, Case IPR2016-01144, dated Sep. 8, 2016 (58 pgs).
*Duncan Parking Technologies, Inc. vs. IPS Group Inc.*, Patent Owner's Preliminary Response, Case IPR2016-01145, dated Sep. 8, 2016 (52 pgs).
*Duncan Parking Technologies, Inc. vs. IPS Group Inc.*, Patent Owner Response, Case IPR2016-00067, dated Jul. 12, 2016 (32 pgs).
*Duncan Parking Technologies, Inc. vs. IPS Group Inc.*, Petition for Inter Partes Review, U.S. Pat. No. 8,595,054, dated Jun. 3, 2016 (79 pgs).
*Duncan Parking Technologies, Inc. vs. IPS Group Inc.*, Petition for Inter Partes Review, U.S. Pat. No. 7,854,310, dated Jun. 3, 2016 (70 pgs).
Notice of Allowance issued in U.S. Appl. No. 13/141,977, dated Jul. 29, 2016 (62 pgs).
Office Action issued in U.S. Appl. No. 14/743,691, dated Sep. 2, 2016 (26 pgs).
U.S. Design Patent Application U.S. Appl. No. 29/466, 268, filed Sep. 5, 2013 (19 pgs).
U.S. Design Patent Application U.S. Appl. No. 29/466,267, filed Sep. 5, 2013 (19 pgs).
U.S. Design Patent Application U.S. Appl. No. 29/466,269, filed Sep. 5, 2013 (19 pgs).
U.S. Design Patent Application U.S. Appl. No. 29/477,176, filed Dec. 19, 2013 (24 pgs).
U.S. Design Patent Application U.S. Appl. No. 29/477,195, filed Dec. 19, 2013 (21 pgs).
U.S. Design Patent Application U.S. Appl. No. 29/477,196, filed Dec. 19, 2013 (21 pgs).
U.S. Design Patent Application U.S. Appl. No. 29/477,339, filed Dec. 20, 2013 (21 pgs).
U.S. Design Patent Application U.S. Appl. No. 29/477,402, filed Dec. 20, 2013 (24 pgs).
U.S. Design Patent Application U.S. Appl. No. 29/477,405, filed Dec. 20, 2013 (24 pgs).

\* cited by examiner

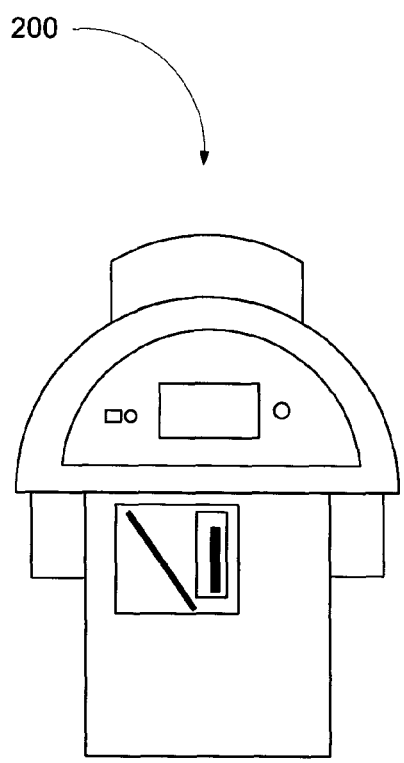
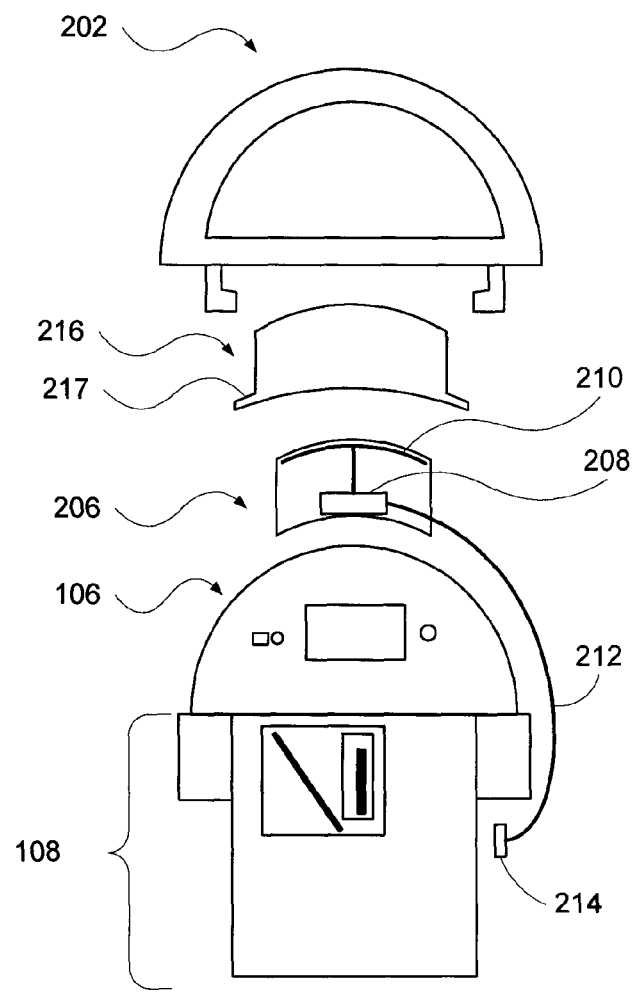
Figure 2A
Figure 2B

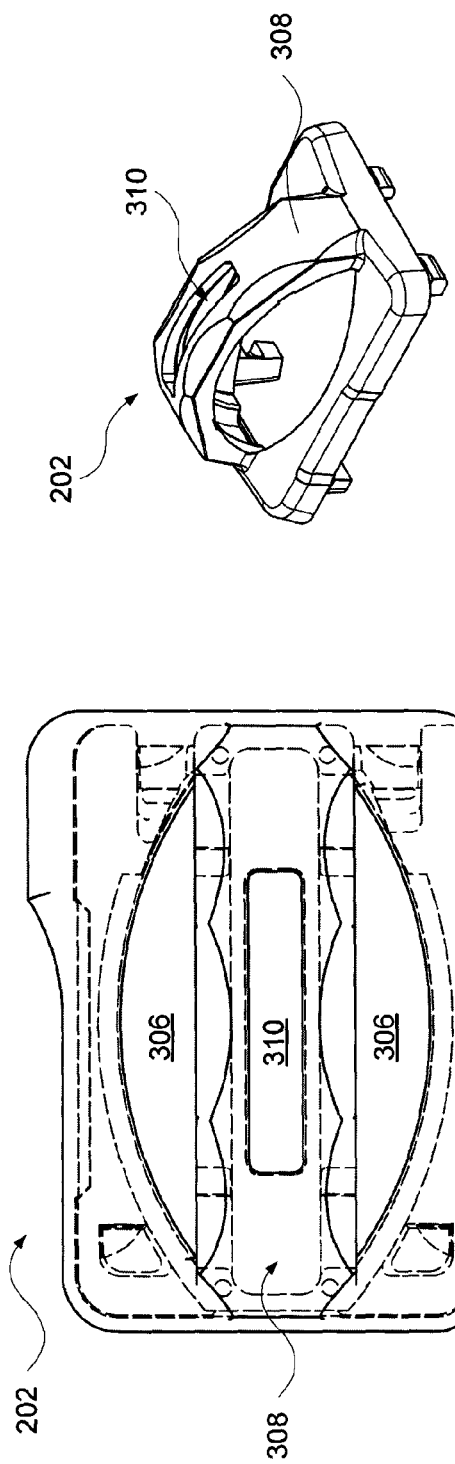
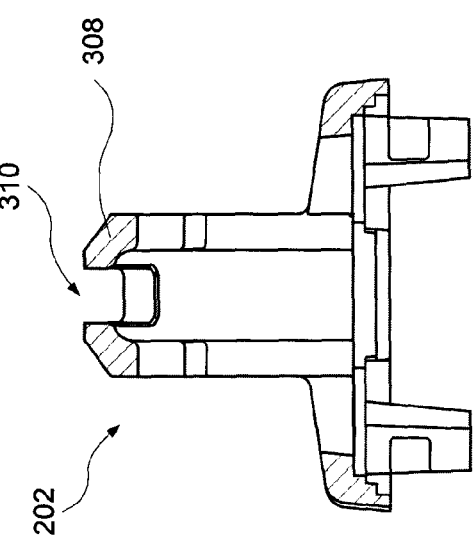
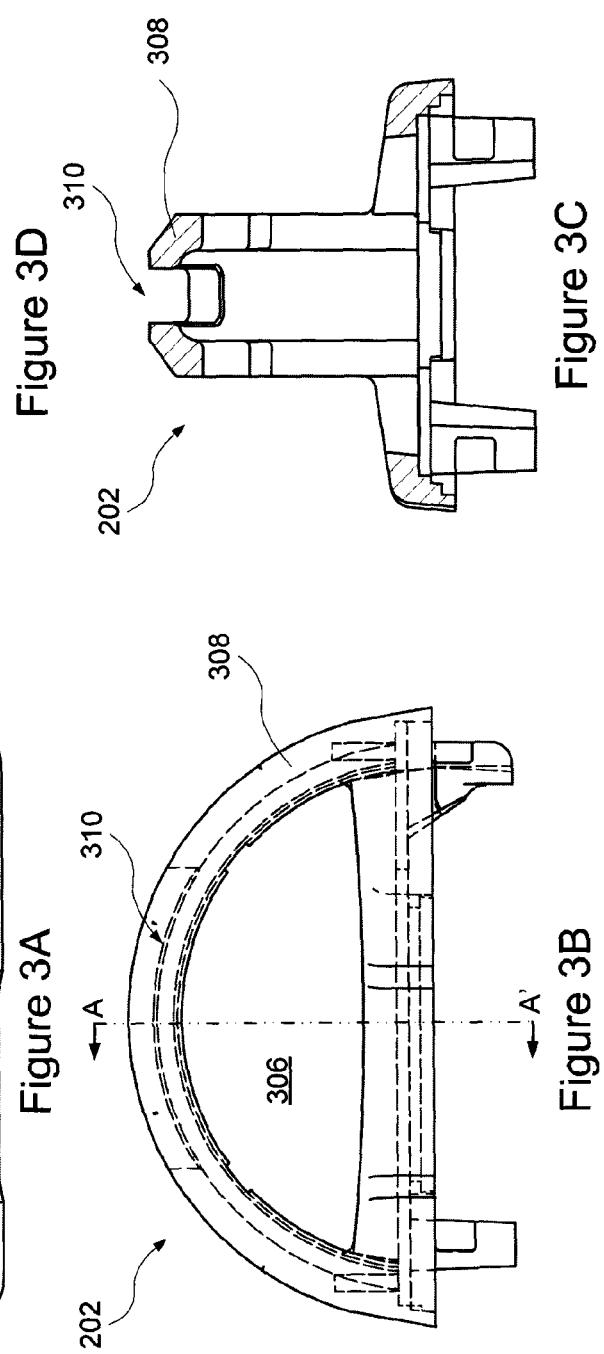

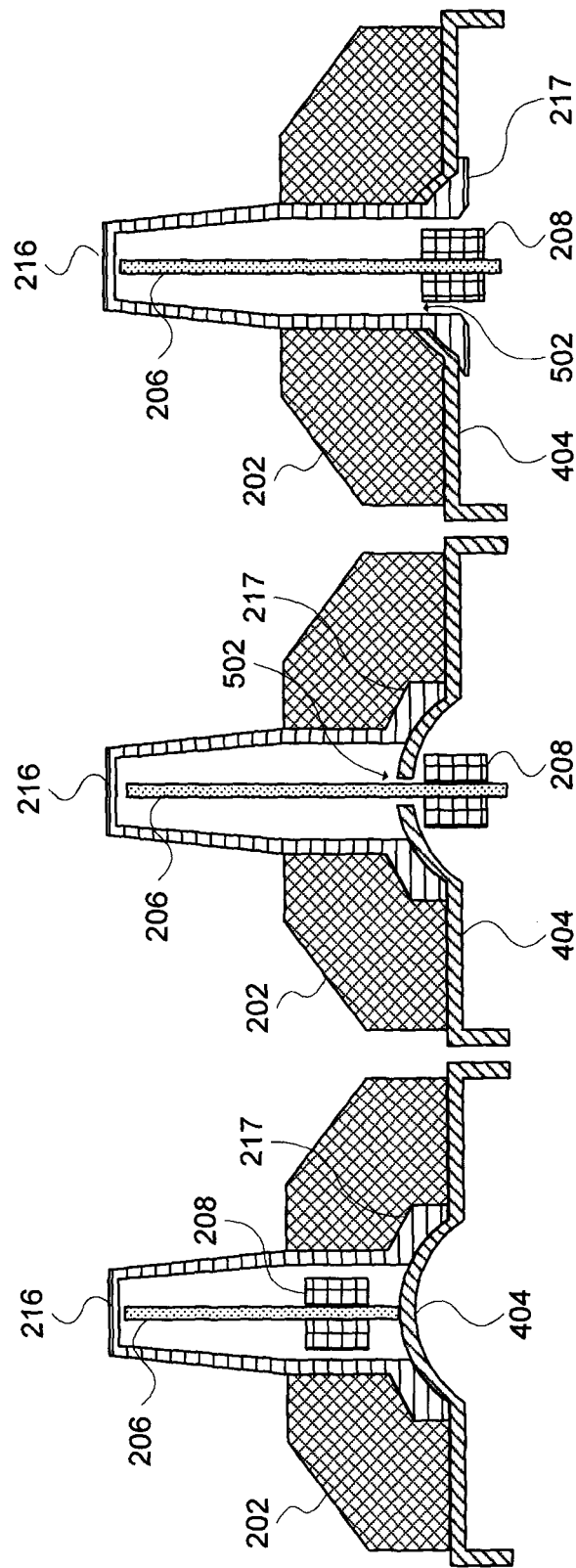

Azimuthal (x-y) plane, Phi component:

Elevation (x-z) plane, Theta component:

Azimuthal (x-y) plane, Theta (vertical) component:

Azimuthal (x-y) plane, Phi (horizontal) component (note scale change):

Elevation (x-z) plane, Theta component (note scale change)::

Elevation (x-z) plane, Phi component (non-existent):

Azimuthal (x-y) plane, Theta (vertical) component:

Azimuthal (x-y) plane, Phi (horizontal) component:

Elevation (x-z) plane, Theta component (note scale change):

Elevation (x-z) plane, Phi component:

Azimuthal (x-y) plane, Theta (vertical) component:

Azimuthal (x-y) plane, Phi (horizontal) component:

Elevation (x-z) plane, Theta component (note scale change):

Elevation (x-z) plane, Phi component:

SINGLE SPACE WIRELESS PARKING WITH IMPROVED ANTENNA PLACEMENTS

CROSS REFERENCE TO RELATED APPLICATIONS

This application is a 35 U.S.C. §371 application based on PCT/CA2009/001657, filed Nov. 18, 2009, which in turn claims the benefit of and priority to U.S. Provisional Application Ser. No. 61/140,543, filed Dec. 23, 2008, the contents of which are incorporated herein by reference.

FIELD OF THE INVENTION

The invention relates generally to parking meters, and in particular to single space wireless parking meters

BACKGROUND

Often, major cities deploy thousands of single-space parking meters throughout their jurisdiction. The management of such a deployment is labor intensive. Costs of overhead can be larger than necessary due to the normal inefficiencies in managing large distributed systems.

Wireless parking meters have been devised that enable the parking meter to communicate with enforcement officers to make parking enforcement more efficient, as well as to allow for payment using credit cards. The wireless parking meters may use a protocol such as ZigBee or SSIPCO for the wireless communication. The wireless systems may have disadvantages when used in single space parking meters, which may include, for example, shorter operating times due to increased power consumption, and communication latency due to the communication protocol used.

The wireless single space parking meters may include an antenna for transmitting radio frequency (RF) signals used for the wireless communication. However, the placement of the antenna has not provided efficient transmission of the RF signals, resulting in higher power consumption, lower communication range, or both.

SUMMARY

In one embodiment the current disclosure provides a parking meter comprising a mechanism housing comprising an upper mechanism housing enclosing a display module for displaying parking meter related information including an amount of parking meter time purchased; and a lower mechanism housing enclosing parking meter mechanism components for operating the parking meter. The parking meter further comprises a radio communication module coupled to at least one of the parking meter mechanism components for wirelessly communicating parking meter information and a parking meter housing enclosing at least the mechanism housing, the parking meter housing comprising: an upper housing enclosing the upper mechanism housing, the upper housing comprising an opening in the upper housing for viewing at least a portion of the display module; and a lower housing enclosing the lower mechanism housing. The parking meter further comprises an antenna coupled to the radio communication module located above the mechanism housing to transmit and receive radio frequency (RF) signals through at least a portion of the parking meter that has a high emissivity to RF signals (the transmission path).

In another embodiment the current disclosure provides a parking meter comprising a mechanism housing comprising an upper mechanism housing enclosing a display module for displaying parking meter related information including an amount of parking meter time purchased; and a lower mechanism housing enclosing parking meter mechanism components for operating the parking meter. The parking meter further comprises a radio communication module coupled to at least one of the parking meter mechanism components for wirelessly communicating parking meter information and a parking meter housing enclosing at least the mechanism housing, the parking meter housing comprising: an upper housing enclosing the upper mechanism housing, the upper housing comprising an opening in the upper housing for viewing at least a portion of the display module; and a lower housing enclosing the lower mechanism housing. The parking meter further comprises an antenna coupled to the radio communication module located above the mechanism housing to transmit and receive radio frequency (RF) signals, the antenna having a shape selected from the group consisting of a 'T' shape; an 'F' shape; and an 'L' shape.

BRIEF DESCRIPTION OF THE DRAWINGS

Embodiments of the novel technology are described herein, with reference to the drawings in which.

FIG. 2A depicts a schematic of an embodiment of a single space parking meter with an improved antenna placement;

FIG. 2B depicts an exploded view of the single space parking meter of FIG. 2A;

FIGS. 3A-3D depict various views of an illustrative upper housing of an illustrative parking meter;

FIG. 5A-5C depict schematics of various embodiments of an illustrative parking meter with improved antenna placement.

DETAILED DESCRIPTION

A wireless parking meter is described herein that provides for better placement of an antenna. The location of the antenna described herein allows the antenna to transmit and receive radio frequency (RF) signals through a portion of the parking meter that has a high permittivity to the RF signals. Advantageously, the location of the antenna described herein allows for a more power efficient wireless parking meter, a larger communication range, or both. Furthermore, current parking meters may be modified to make use of the improved antenna locations described herein, reducing the cost of implementing wireless parking meters.

Figures 1A, 1B:
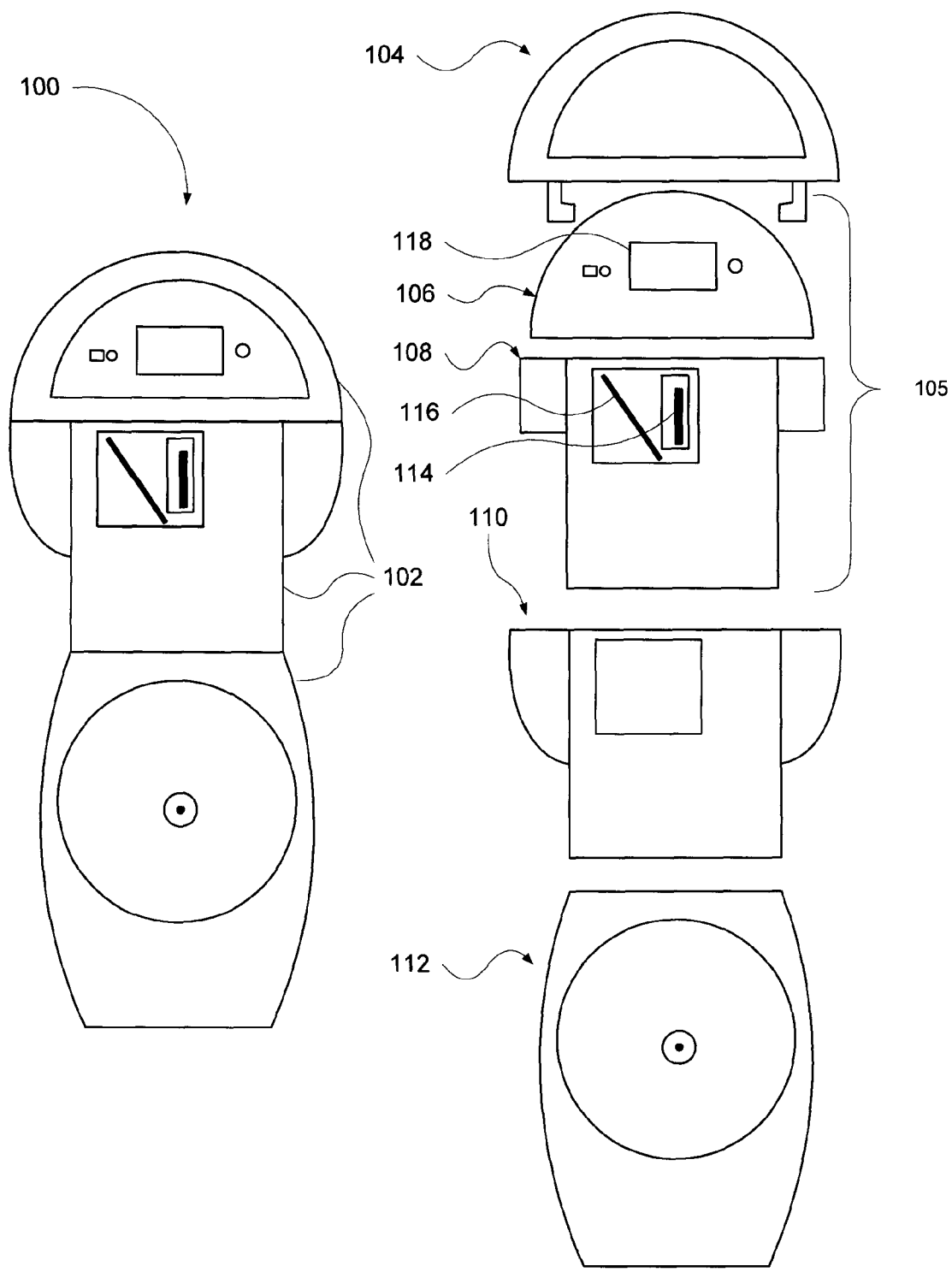
FIG. 1A depicts a schematic of a typical single space parking meter.
FIG. 1B depicts an exploded view of the single space parking meter of FIG. 1A.

FIGS. 1A and 1B depict a typical single space parking meter 100. A single space parking meter 100 typically comprises an outer housing 102, or simply a housing, comprising multiple components. The housing 102 typically comprises a two-part upper housing comprising of a removable upper housing cap 104 that is typically locked or otherwise secured to a meter housing 110 which in turn is attached to a lower vault housing 112. The upper housing cap 104 generally has a semi elliptical shape with an opening in the upper housing cap for viewing a display of the parking meter 100. It will be appreciated that the shape of the upper housing cap may be of other shapes. The upper housing cap 104 may include an opening on both sides in order to allow viewing of the display from either side of the parking meter 100. The opening in the upper housing cap is sealed by a dome situated within the housing. The dome is typically made from a high strength transparent material, such as Lexan. The meter housing 110 may include space for holding a coin vault, or alternatively may have a further lower vault housing 112 that can be secured to the meter housing 110 to hold the coin vault. The outer housing 102 provides physical protection for the components of the parking meter. The outer housing 102 also protects the components of the parking meter from the exterior environment. The outer housing 102 is typically made from a high strength metal that provides sufficient protection against intentional vandalism.

The outer housing 102 encloses a parking meter mechanism housing and various parking meter mechanism components. The parking meter mechanism housing and parking meter mechanism components may be referred to collectively as the parking meter mechanism 105. The parking meter mechanism 105 provides for the various functionality of the wireless parking meter 100. For example, the mechanism components may include a coin chute 114 for detecting coins inserted into the parking meter 100, a card reader 116 for detecting magnetic stripe, or smart-chip cards inserted into the parking meter 100, a main processing board (not shown) including a processor and memory storing instructions that, when executed by the processor, control the operation of the parking meter 100 as well as a display 118, or display module, for displaying parking meter information, such as an amount of parking time purchased, parking meter error messages, expired time, etc.

The parking meter mechanism housing generally comprises two sections, an upper mechanism housing 106 that houses the display 118 and a lower mechanism housing 108 that houses the parking meter mechanism components. It will be appreciated that while the display 118 is a component of the parking meter, it is not referred to herein as a mechanism component as it is housed above the mechanism components, such as the coin chute 114, card reader 116 and main processing board. Furthermore, while the upper mechanism housing 106 is located above the lower mechanism housing 108 it will be appreciated that this refers to the assembled mechanism 105. That is, the mechanism housing may be assembled from a back frame that includes a portion of the upper mechanism housing and the lower mechanism housing. The mechanism components and the display 118 may be attached to the back frame. A front frame may be secured over the mechanism components to provide the lower mechanism housing 108 of the assembled mechanism housing.

The parking meter outer housing 102, and the parking meter mechanism housing, present a problem when transmitting and receiving RF signals. The materials of the parking meter outer housing 102 and the mechanism housing are opaque to RF signals, or at least attenuate the transmitted RF signals. As a result the RF signals need to be transmitted with a higher power, consuming more power from a battery powering the parking meter 100. Alternatively, the same power may be used to transmit the RF signal; however, this will result in a reduced communication range and possibly require additional infrastructure to provide the wireless communication with the parking meter 100.

In order to increase the transmission efficiency of the RF signals from the parking meter 100, improved locations for the placement of the antenna are described herein. The improved wireless parking meter provides an antenna within the parking meter housing that locates the antenna such that the antenna can transmit and receive RF signals through a portion of the parking meter housing that has a high permittivity to RF signals. To further increase the transmission efficiency, improved shapes of antennas are described.

FIGS. 2A and 2B depict an illustrative embodiment of an antenna placement for a wireless parking meter 200. FIGS. 2A and 2B do not depict the lower vault housing or the meter housing of the wireless parking meter. The wireless parking meter 200 includes a fin cover 216 that protrudes through a second opening in the upper housing cap 202. The fin cover 216 encloses the antenna 210. The fin cover 216 is constructed from a material with a high permittivity to RF signals. The protruding fin cover 216 allows the antenna 210 to be located above the upper housing cap 202. As depicted in FIG. 2B the fin cover 216 may house the antenna 210 which is located on a radio board 206. The radio board 206 may include a radio control module 208 for controlling the transmission, and reception, of the RF signals. The radio control module 208 may be coupled to a parking meter mechanism component housed in the lower mechanism housing 108, such as the main control board, via an appropriate cable 212 with an appropriate connector 214. It will be appreciated that while the radio control module 208 is depicted as being located on the radio board 206, it may be located within the parking meter mechanism housing, or other convenient locations. If the radio control module 208 is not located on the radio board, the cable 212 and connector 214 may be used to connect the antenna to the radio control module 208. Additionally, it will be appreciated that, while the radio control module 208 has been described as being a separate component, it may be included as a component of the main control board or other parking meter mechanism components.

As described above, the fin cover 216 protrudes upwardly through a second opening in the upper housing cap 202. The second opening, or fin opening, is sized to allow a portion of the fin cover 216 to pass through. However a base portion 217 of the fin cover is enlarged so that it does not pass through the fin opening of the upper housing cap 202. This base portion 217 of the fin cover may also seal the fin opening in the upper housing. It will be appreciated that other means of securing the fin cover 216 to the upper housing cap 202 are possible, and will be apparent to those skilled in the art.

The fin cover 216 allows the antenna 210 to be located above the upper housing cap 202 of the parking meter 200. The fin cover 216 is constructed from a material with a higher permittivity to RF signals than the housings of the parking meter. As such, the fin cover 216 provides an improved antenna placement in which the antenna 210 can transmit and receive RF signals through a portion of the parking meter 200 that has a high permittivity to RF signals.

FIGS. 3A-3D depict various views of an illustrative embodiment of an upper housing for a parking meter 200. The upper housing cap 202 may be modified from an upper housing cap as used in previous parking meter housings. The upper housing cap 202 includes first openings 306, which may be referred to as dome openings. The dome openings 306 provide an opening through which the parking meter display may be viewed. If the display of the parking meter 200 is a dual sided display, dome openings 306 may be provided on each side of the upper housing cap 202. The upper housing cap 202 includes a central portion 308 located between the two dome openings; or alternatively located about a center of the upper housing cap 202 if only a single dome opening 306 is provided. The central portion 308 of the parking meter housing cap generally has a semi elliptical, or an actuate, shape. A second opening, or fin opening 310, is provided in the upper housing cap 202. As depicted in the Figures, the fin opening 310 is located centrally in the central portion 308 of the upper housing cap 202. It will be appreciated that the fin opening 310 is located centrally within the central portion 308 of the upper housing cap 202 for aesthetic reasons, and for the simplicity of forming the opening within the central portion 308. The fin opening 310 may be located at any suitable location of the upper housing cap 202 that allows the fin cover 216, and so the antenna housed within, to protrude away from the upper housing cap 202. Additionally, although the fin opening 310 has been described as being positioned within the upper housing cap 202, it is possible to locate the fin opening 310, and the fin cover 216, within any portion of the parking meter outer housing, for example within the meter housing. It will be appreciated that positioning the fin opening 310 within the upper housing cap 202 has the advantage of being relatively easy to replace if required. If the fin opening 310 is located within the meter housing, the upper housing cap 202 would be required to be removed, as well as possibly the parking meter mechanism housing in order to replace or service the fin cover 216 located within the fin opening 310. Removing the parking meter mechanism housing may require further disassembly of the parking meter 200 than would be required if simply placing the fin opening 310 in the upper housing cap 202.

Figure 4C:
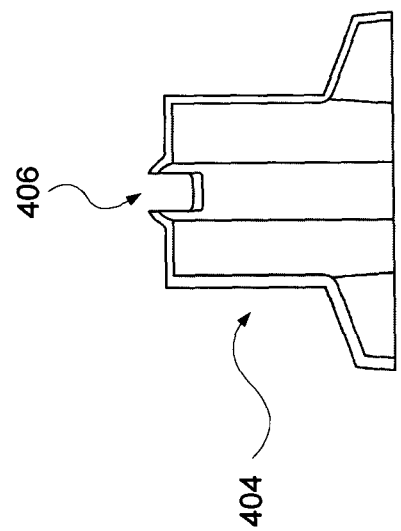
FIG. 4A-4C depict various views of an illustrative dome covering of an illustrative parking meter.
Figure 4A:
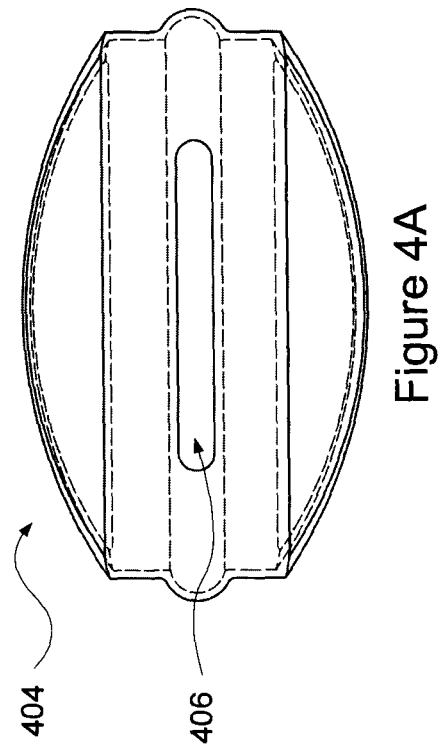
Figure 4B:
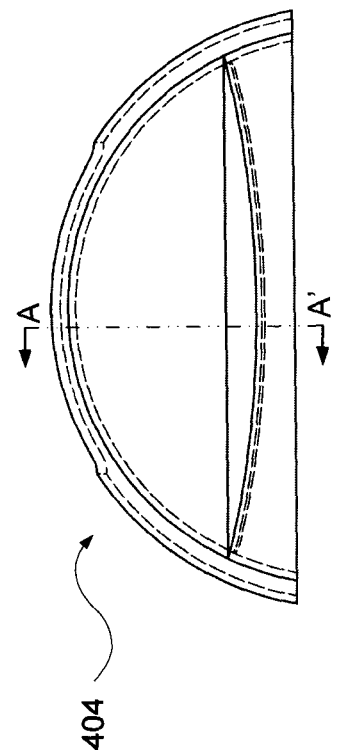

FIGS. 4A-4C depict various views of an illustrative dome cover 404. The dome cover 404 may be used with the upper housing cap 202 of FIGS. 3A-3D. The dome cover 404 includes a radio board opening 406 that is located to correspond with the fin opening 310 of the upper housing cap 202 of FIGS. 3A-3D. The radio board opening 406 of the dome cover 404 allows the radio board 206 to be situated above the dome cover 404 while having a portion of the radio board 206 pass through the dome cover 404. The radio board opening 406 may register the radio board 206 within the parking meter housing in order to securely position the radio board 206 within the fin cover. The size of the radio board opening 406 may vary. The radio board opening 406 may be sized to accommodate the radio control module 208 located on the radio board 206. Alternatively, the radio board opening 406 may be sized to accommodate only the board portion of the radio board 206, while the radio control module 208, if present, is situated above or below the dome cover 404. Alternatively, the dome cover 404 may not have a radio board opening 406 at all, and the radio board 206 may be wholly located above the dome cover 404.

If the dome cover 404 includes a radio board opening 406, it may be used to route the connection cable 212 from the radio board 206 to the appropriate location of the parking meter mechanism. If the radio board opening 406 is not present, the cable 212 may be routed along the dome cover 404 to a position where the dome cover 404 meets the parking meter housing and then routed to the appropriate connection location on the parking meter mechanism.

FIGS. 5A-5C depict various arrangements of the radio board 206 and fin cover 216 within the upper housing cap 202 and dome cover 404. FIG. 5A depicts a dome cover 404 that does not include a radio board opening. The radio board 206, which may include a radio control module 208, is wholly located above the dome cover 404. The fin cover 216 is located between the dome cover 404 and the upper housing cap 202. A main portion of the fin cover 216 protrudes through the fin opening in the upper housing cap 202. A base portion of the fin cover 216 extends past the fin opening in the upper housing cap 202 and captures the fin cover 216 between the dome cover 404 and the upper housing cap 202, helping to ensure that the fin cover 216 is not easily removed through the fin opening of the upper housing cap 202.

FIG. 5B depicts an alternative embodiment of the arrangement of the radio board 206 and fin cover 216 within the upper housing cap 202 and dome cover 404. The dome cover 404 of FIG. 5B includes a radio board opening 502 that is sized to allow the radio board 206 to pass through but not a radio control module 208, if present. The fin cover 216 is located between the dome cover 404 and the upper housing cap 202 in a similar manner as in the embodiment of FIG. 5A. If the radio control module 208 is present on the radio board 206, it may be located above or below the dome cover 404. If it is located above the dome cover 404, a bottom surface of the radio control module 208 may rest on an upper surface of the dome cover 404, and position the radio board 206 within the fin cover 216. If the radio control module 208 is positioned below the dome cover 404, it may be held between the upper mechanism housing (not shown) and the dome cover 404.

FIG. 5C depicts a further alternative embodiment of the arrangement of the radio board 206 and fin cover 216 within the upper housing cap 202 and dome cover 404. The radio board opening 502 in the dome cover 404 is expanded to allow the main portion of the fin cover 216 to pass through. The base portion of the fin cover 216 is captured by the dome cover 404, preventing the fin cover 216 from passing through the radio board opening 502. The fin cover 216 and the radio board 206, is held in position between the upper mechanism housing and the dome cover 404.

The radio board 206 may be further held in position within the fin cover 216, of any of the described embodiments, by a radio board clip or other suitable means. Although not required to locate the radio board 206 within the fin cover 216, the radio board clip may hold the radio board 206 within the fin cover 216, which may facilitate assembly or disassembly of the parking meter.

As is apparent from the above description of various embodiments, the antenna 210, and possibly the radio control module 208, is housed at the top of the parking meter within the fin cover 216. The fin cover 216 provides the required physical strength to prevent, or reduce, the likelihood that the antenna 210 can be broken off from the parking meter.

The fin cover 216 is constructed from a material with a high permittivity to RF signals and in particular to the RF signals used by the radio control module 208 of the parking meter. The fin cover 216 may be made from a plastic or similar material. The following table provides a listing of possible suitable materials for the fin cover 216, as well as their RF characteristics.

TABLE 1

Table showing RF properties of various materials

| Product & Grade | Color | Dielectric Constant (Dk) (Relative Permittivity) | | | Loss Tangent (Df) (Dissipation Factor) | | |
|---|---|---|---|---|---|---|---|
| | | 1.2 GHz | 2.4 GHz | 10 GHz | 1.2 GHz | 2.4 GHz | 10 GHz |
| HB Rated | | | | | | | |
| CYCOLOY ® C1000HF | natural | 2.72 | 2.71 | | 0.0045 | 0.0045 | |
| CYCOLOY ® C1200HF | natural | 2.72 | 2.75 | | 0.0046 | 0.0046 | |
| GELOY ® CR7520 | unknown | 2.98 | 2.97 | 2.87 | 0.0212 | 0.0186 | 0.0148 |
| LEXAN ® 121R | natural | 2.76 | 2.80 | | 0.0047 | 0.0047 | |
| LEXAN ® EXL1414 | unknown | 2.83 | 2.86 | | 0.0062 | 0.0056 | |
| LEXAN ® EXL1414 (dry) | unknown | 2.81 | 2.85 | | 0.0060 | 0.0052 | |
| XENOY ® 5731 | unknown | 2.88 | 2.93 | 2.85 | 0.0082 | 0.0069 | 0.0057 |
| ® X7110 | natural | | 2.83 | | | 0.0121 | |
| XYLEX ® X8210 | NA9A004 | | 2.84 | | | 0.0141 | |
| V-2 Rated | | | | | | | |
| XYLEX ® X7200 | NA9A008 | | 2.87 | | | 0.0134 | |
| V-1 Rated | | | | | | | |
| NORYL ® EN265 | unknown | 2.71 | 2.69 | 2.65 | 0.0029 | 0.0030 | 0.0029 |
| V-0 Rated | | | | | | | |
| ULTEM ® 1000 | unknown | 3.05 | 3.09 | 3.05 | 0.0025 | 0.0031 | 0.0047 |
| CYCOLOY ® C6200 | Natural | | 2.87 | | | 0.0134 | |
| V-0 Rated, UV Stabilized | | | | | | | |
| LEXAN ® 923A | unknown | 2.81 | 2.82 | 2.76 | 0.0058 | 0.0052 | 0.0050 |
| VALOX ® 357U | unknown | 2.92 | 2.91 | 2.86 | 0.0122 | 0.0103 | 0.0084 |
| VALOX ® 364 | unknown | 2.88 | 2.93 | 2.85 | 0.0079 | 0.0074 | 0.0061 |

The fin cover 216 may house the radio control module 208 and the antenna 210. The antenna 210 may be formed on the radio board 206. Although the arrangement of the antenna 210 within the parking meter 200 as described above allows RF signals to be transmitted, and received, through a portion of the parking meter 200 with a high permittivity to RF signals and so provides a more efficient wireless parking meter 200, further efficiency may be gained by the type, or shape, of antenna 210 used.

FIGS. 6A-6D depict various shapes of antennas 210A-D that can be used within wireless parking meters. The antennas 210A-D may be formed on the radio board by a metal trace or other techniques known to one skilled in the art. FIGS. 6A-6D also depict the characteristics of connection to the antennas 210A-D that may provide improved impedance matching between the antenna and the RF signal source. It will be appreciated that the characteristics of the connection, including components connected to the antenna and their values may vary depending upon the specific characteristics of the antenna used. One skilled in the art will appreciate that the values of components may be readily determined through experimentation, simulation, or through theoretical calculations.

Figure 6A:
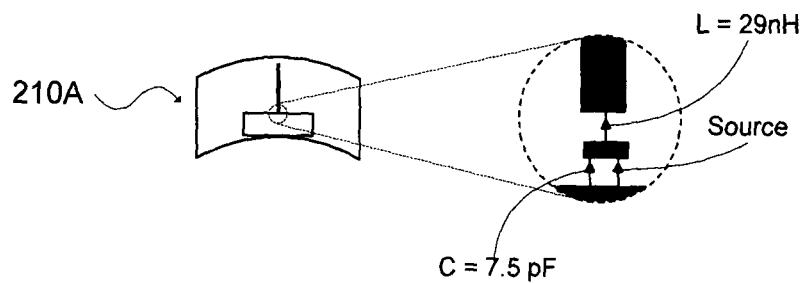
FIGS. 6A-6D depict schematics of illustrative antenna configurations.
Figure 6B:
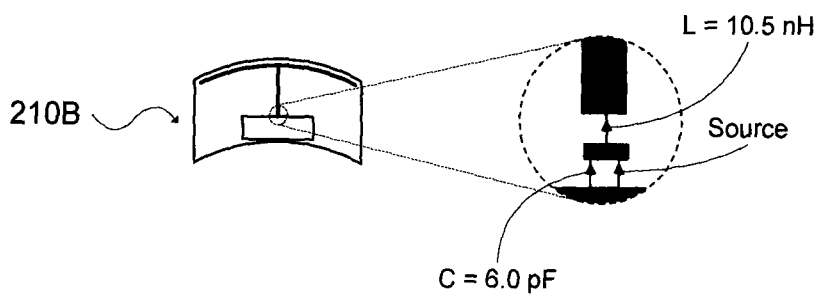
Figure 6C:
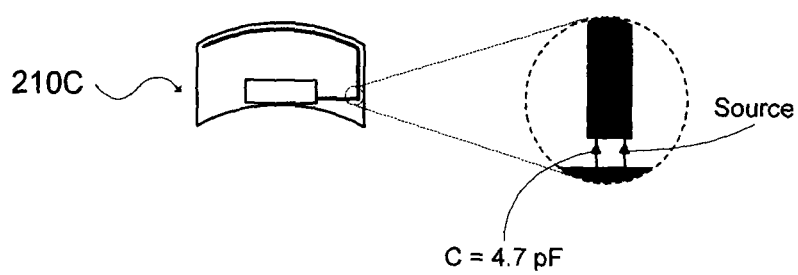
Figure 6D:
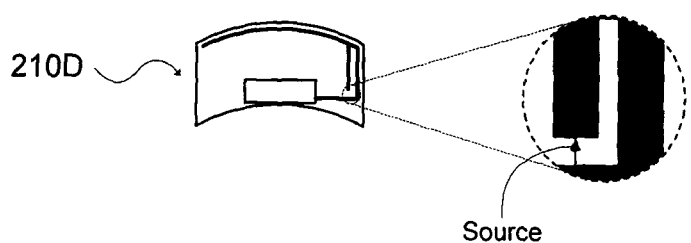

FIG. 6A depicts a monopole antenna 210A. The monopole antenna 210A is coupled to the source through an inductor with a value of 29 nH. A 7.5 pF capacitor is connected in parallel with the source. FIG. 6B depicts a T antenna 210B. A base of the T is coupled to the RF source through a 10.5 nH inductor. A 6.0 pF capacitor is connected in parallel with the source. FIG. 6C depicts an L antenna 210C. A short leg of the antenna 210C is connected to the source with a 4.7 pF capacitor connected in parallel. FIG. 6D depicts an F antenna 210D. A short arm of the F is coupled to the source. No additional capacitors or inductors are required for impedance matching in the arrangement of FIG. 6D. Various specific antenna arrangements have been described with reference to FIGS. 6A-6D. It will be appreciated that these antenna shapes are merely illustrative, and other antennas may be used in a wireless parking meter in accordance with the present disclosure.

Figure 7A:
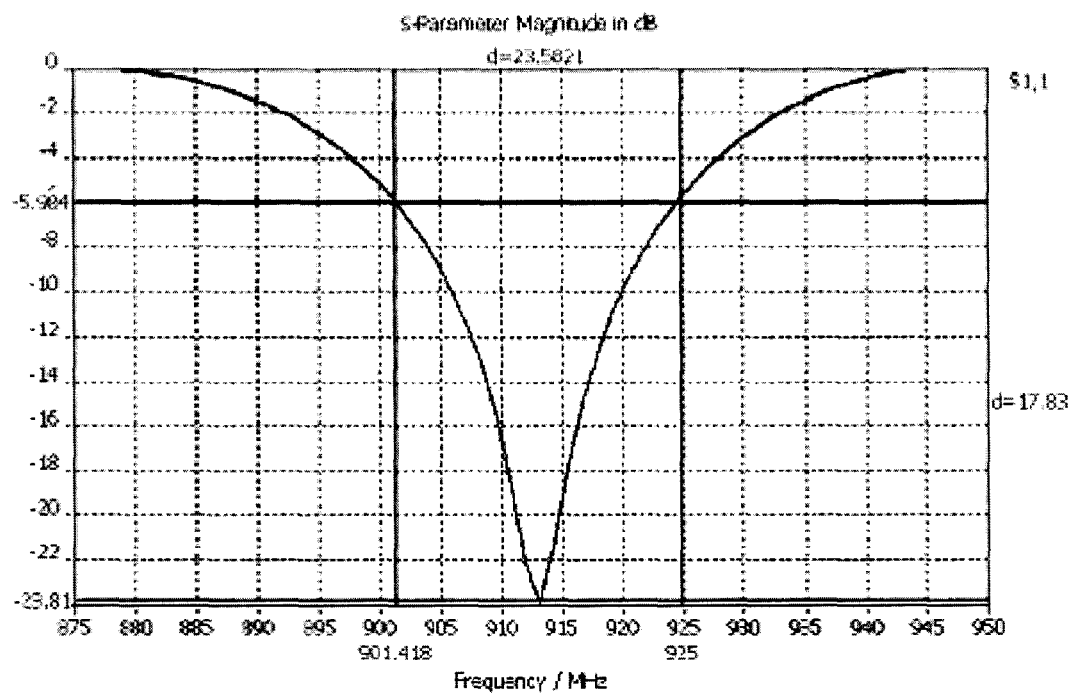
FIGS. 7A-7E depict results of radiation pattern simulations of a monopole antenna.
Figure 7B:
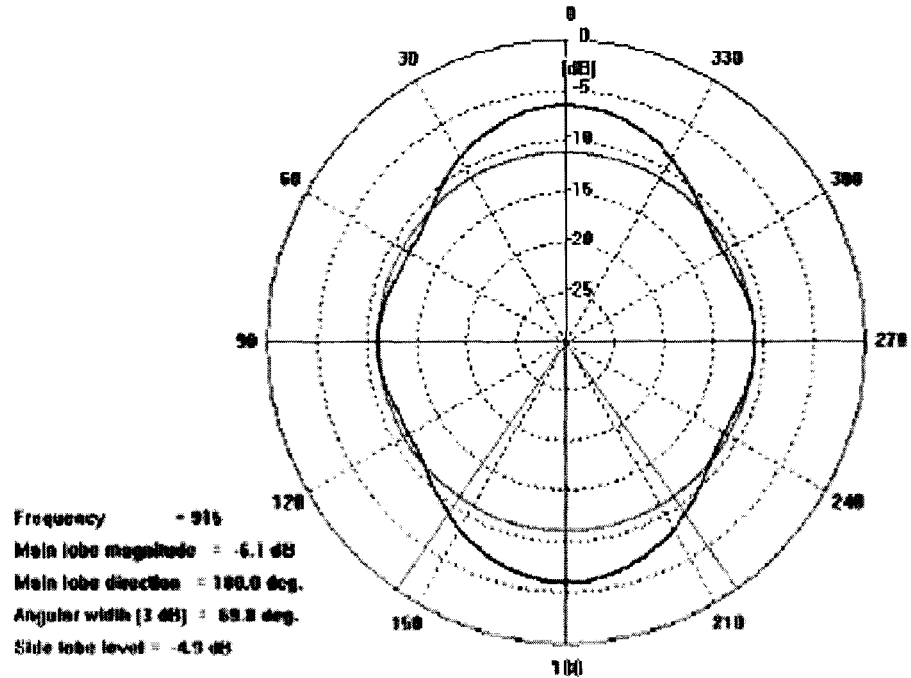
Figure 7C:
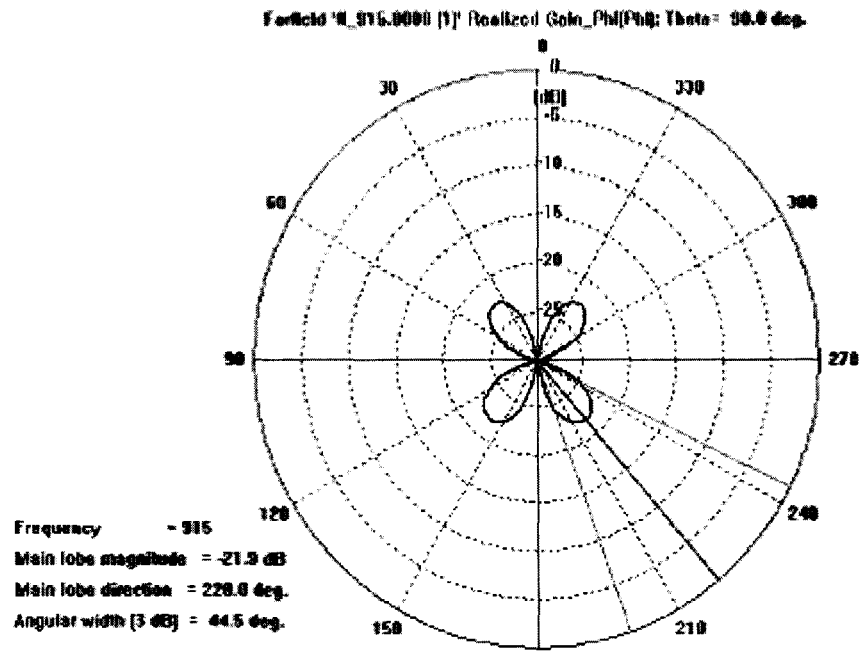
Figure 7D:
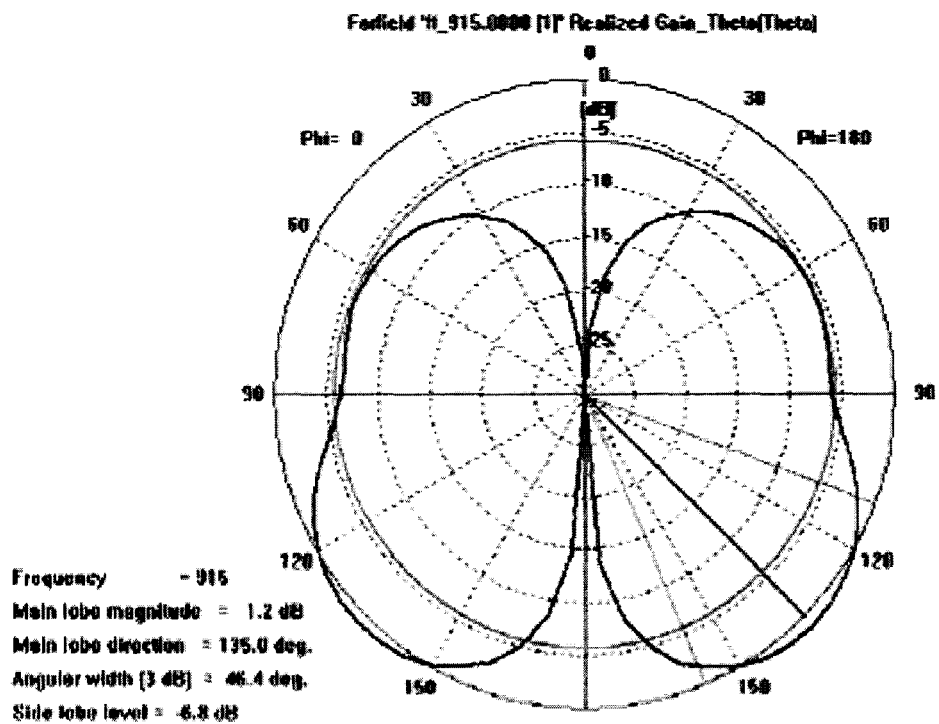
Figure 7E:
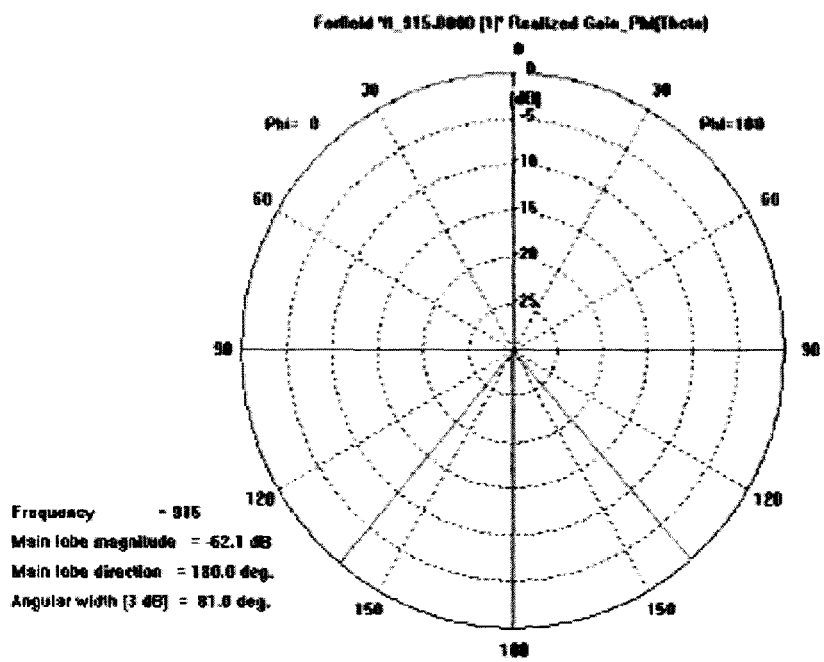

FIGS. 7A-7E depict characteristics of the monopole antenna 210A of FIG. 6A. The characteristics were determined through a simulation of the antenna located above the upper housing of a parking meter housing. FIG. 7A depicts the impedance matching characteristics of the monopole antenna 210A. FIGS. 7B-7E depict the transmission characteristics of the simulated monopole antenna 210A along different planes.

Figure 8A:
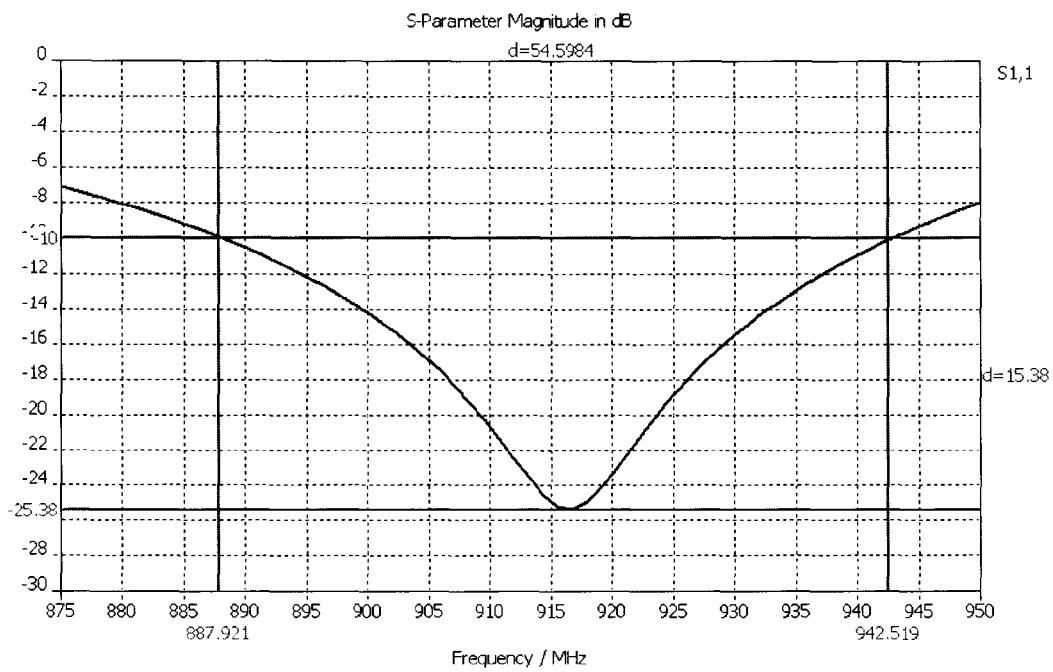
FIGS. 8A-8E depict results of radiation pattern simulations of a T antenna.
Figure 8B:
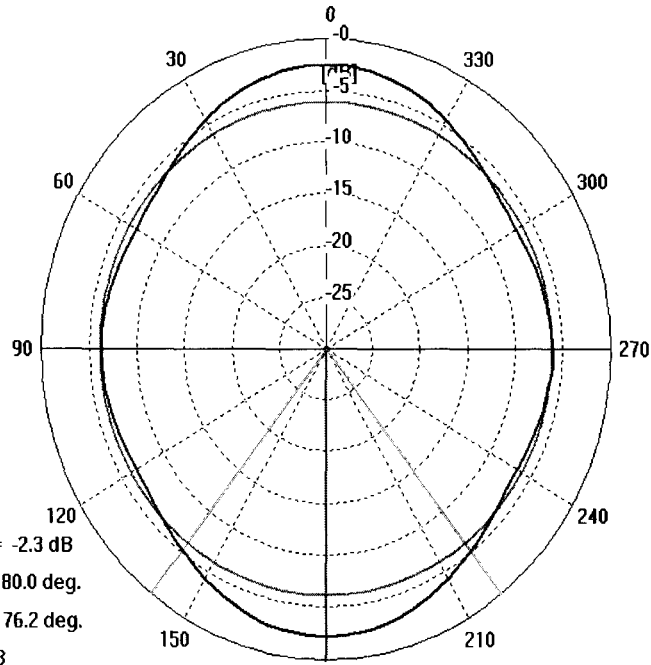
Figure 8C:
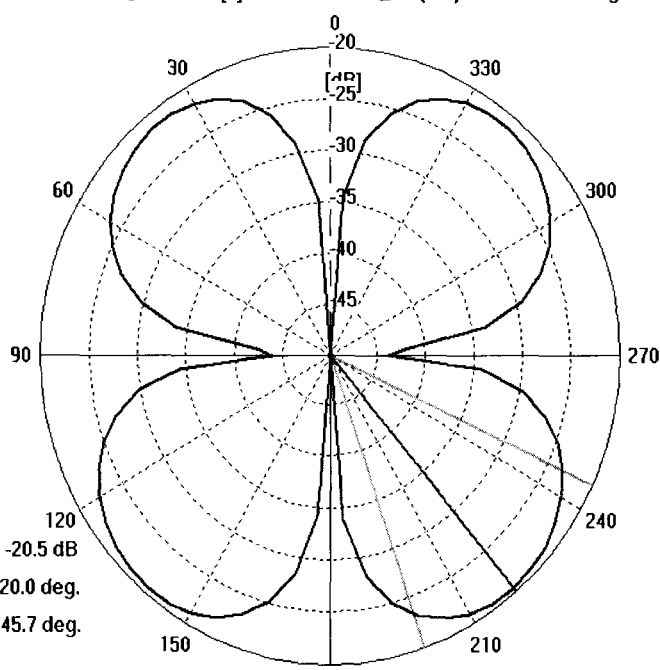
Figure 8D:
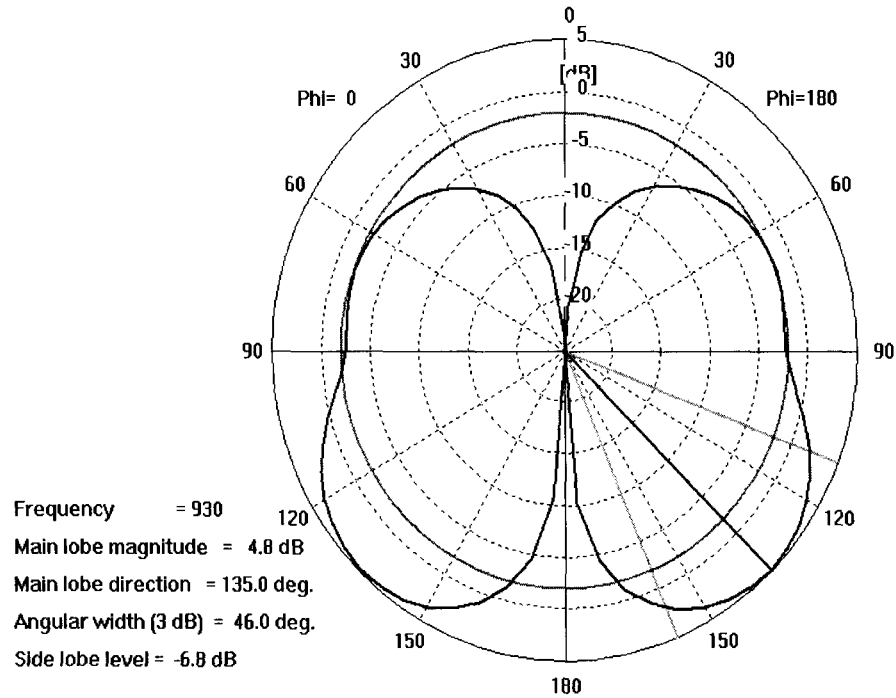
Figure 8E:
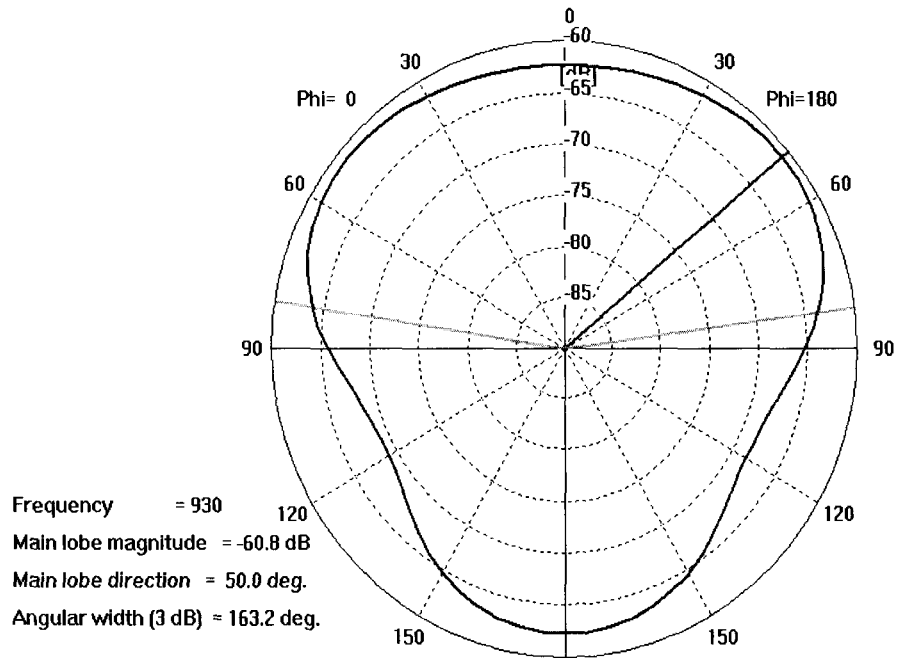

FIGS. 8A-8E depict characteristics of the T antenna 210B of FIG. 6B. The characteristics were determined through a simulation of the antenna located above the upper housing of a parking meter housing. FIG. 8A depicts the impedance matching characteristics of the T antenna 210B. FIGS. 8B-8E depict the transmission characteristics of the simulated antenna along different planes.

Figure 9A:
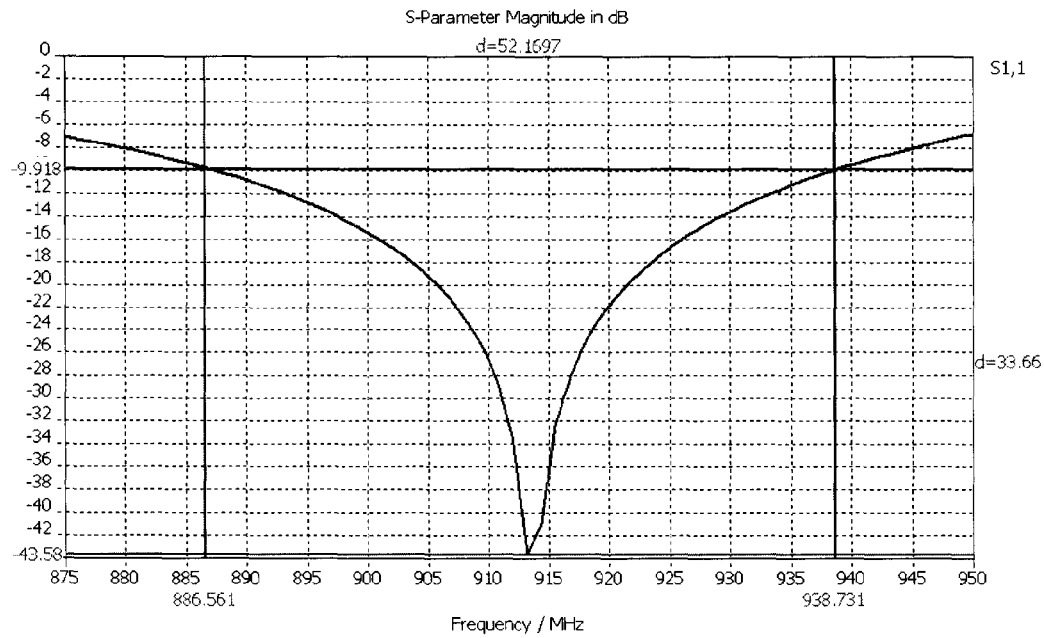
FIGS. 9A-9E depict results of radiation pattern simulations of an L antenna.
Figure 9B:
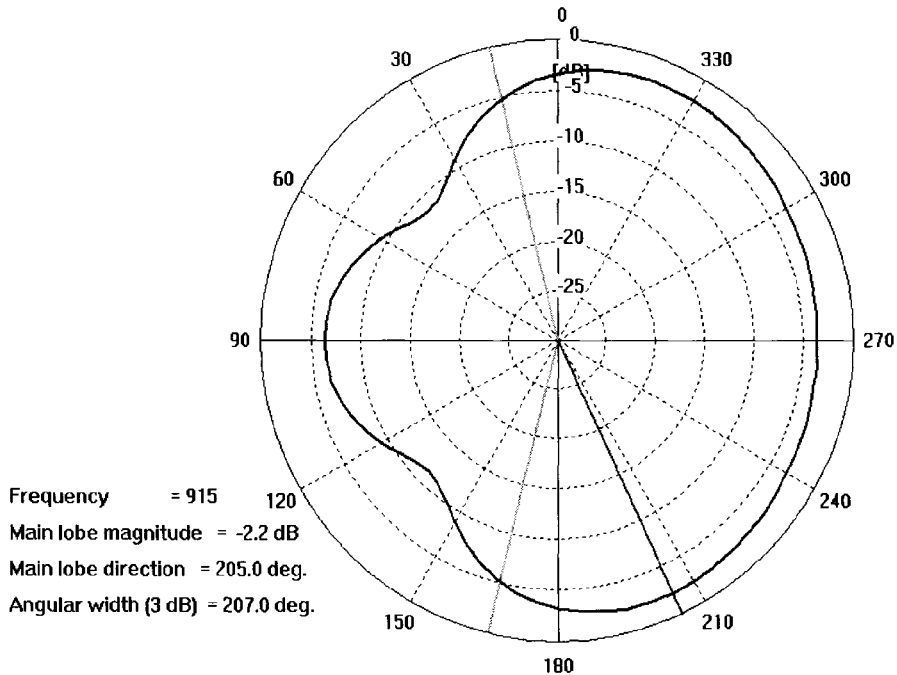
Figure 9C:
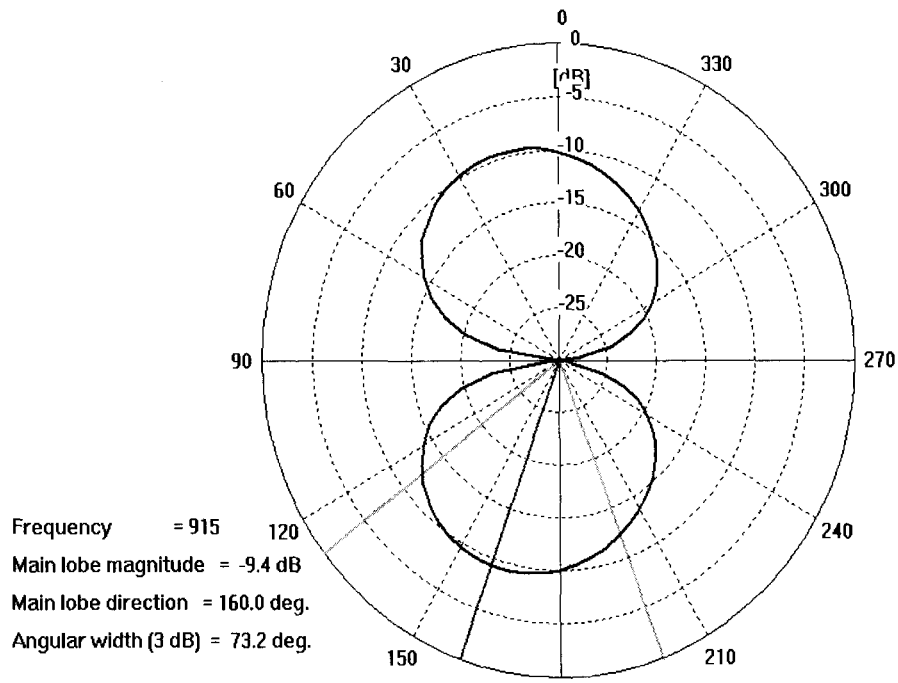
Figure 9D:
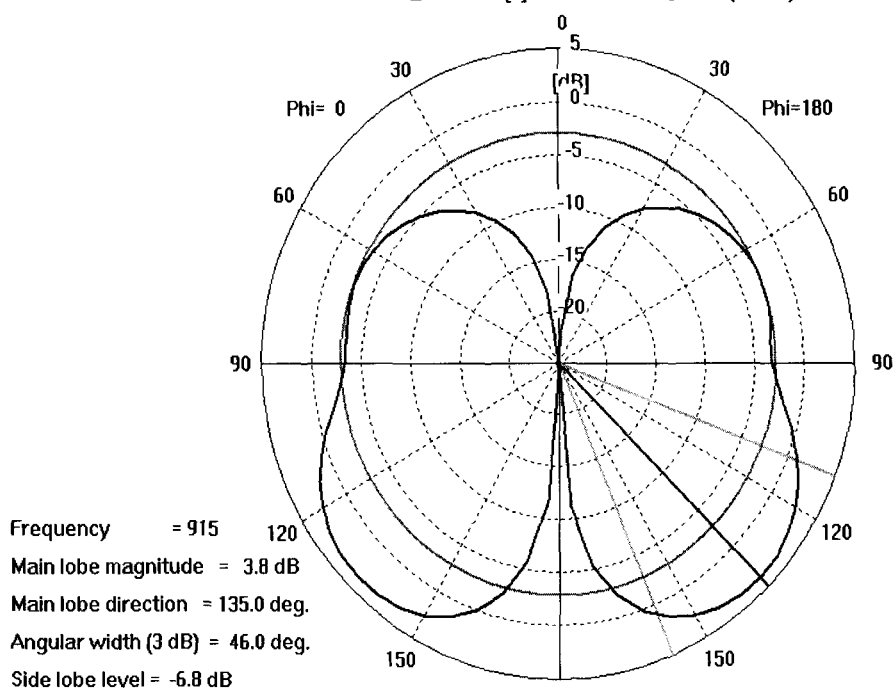
Figure 9E:
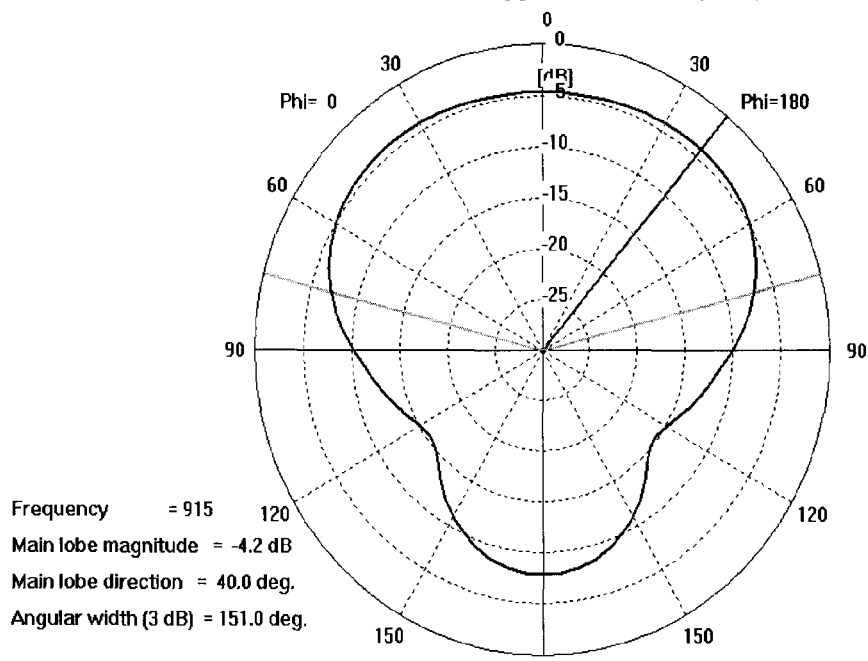

FIGS. 9A-9E depict characteristics of the L antenna 210C of FIG. 6C. The characteristics were determined through a simulation of the antenna located above the upper housing of a parking meter housing. FIG. 9A depicts the impedance matching characteristics of the L antenna 210C. FIGS. 9B-9E depict the transmission characteristics of the simulated antenna along different planes.

Figure 10A:
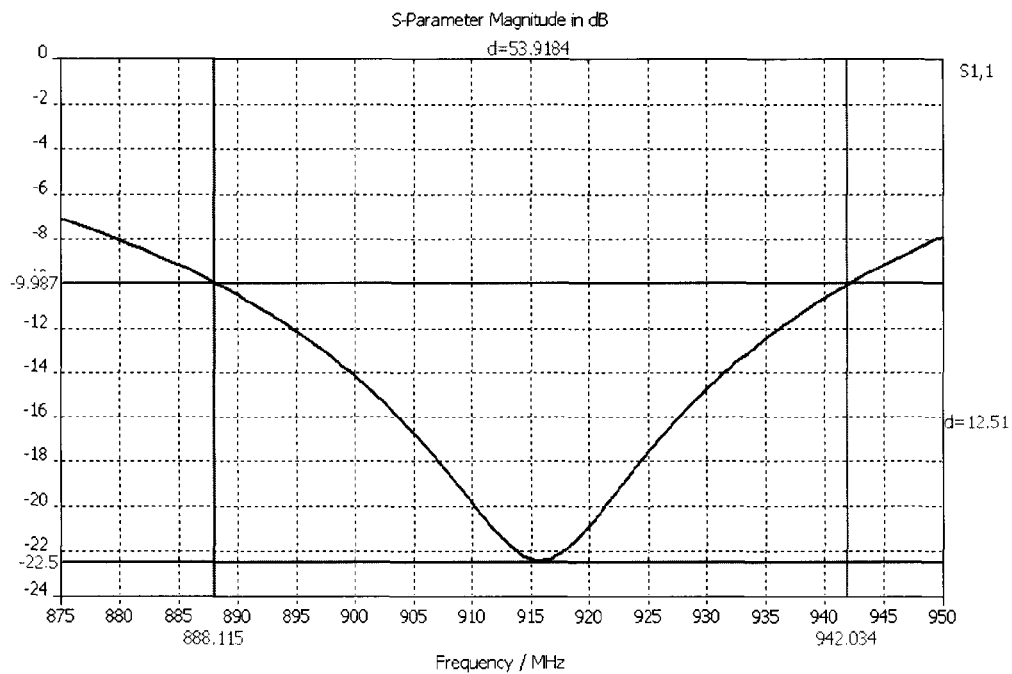
FIGS. 10A-10E depict results of radiation pattern simulations of an F antenna.
Figure 10B:
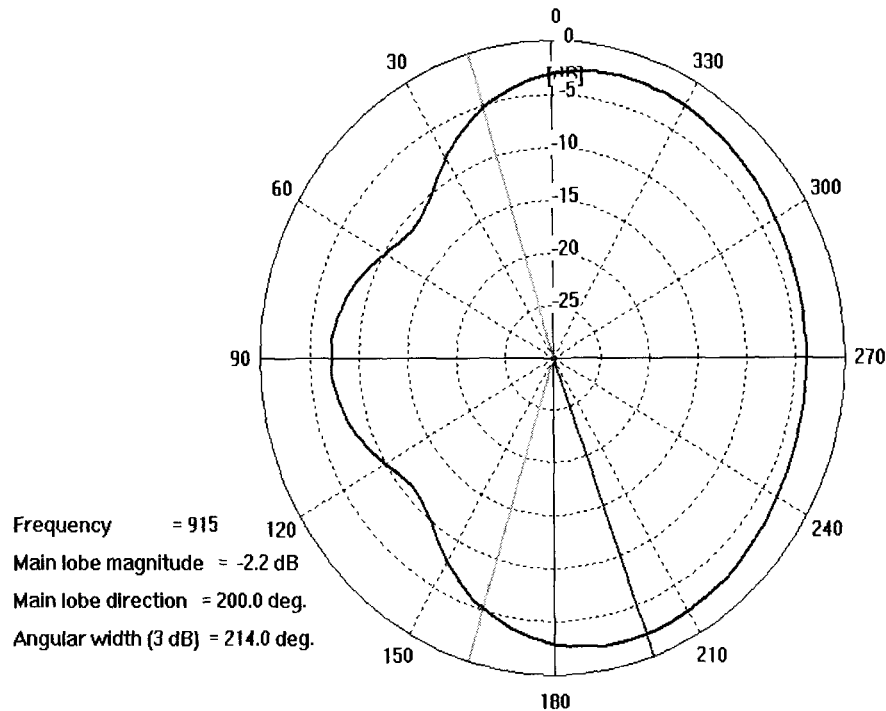
Figure 10C:
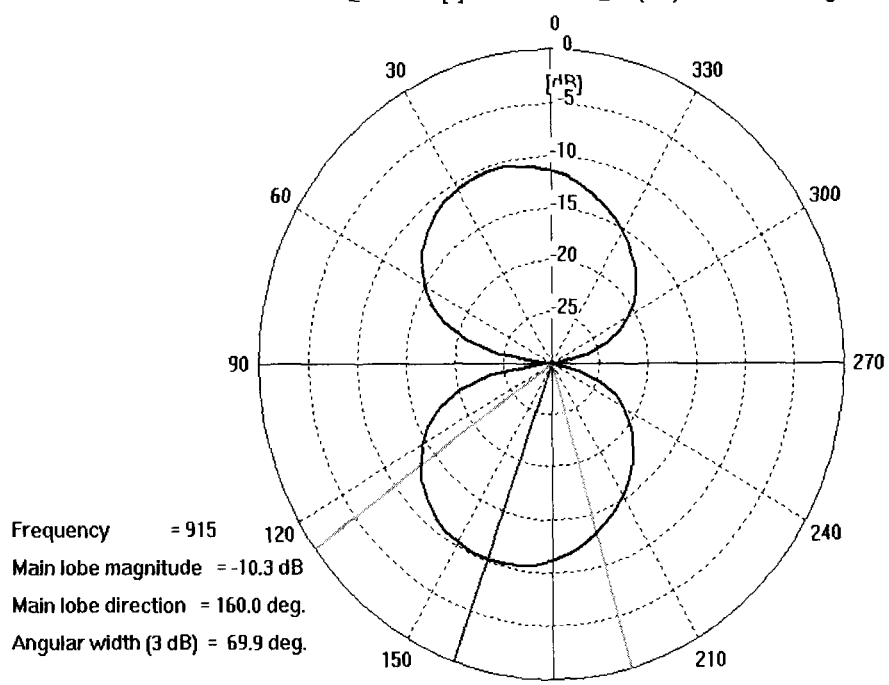
Figure 10D:
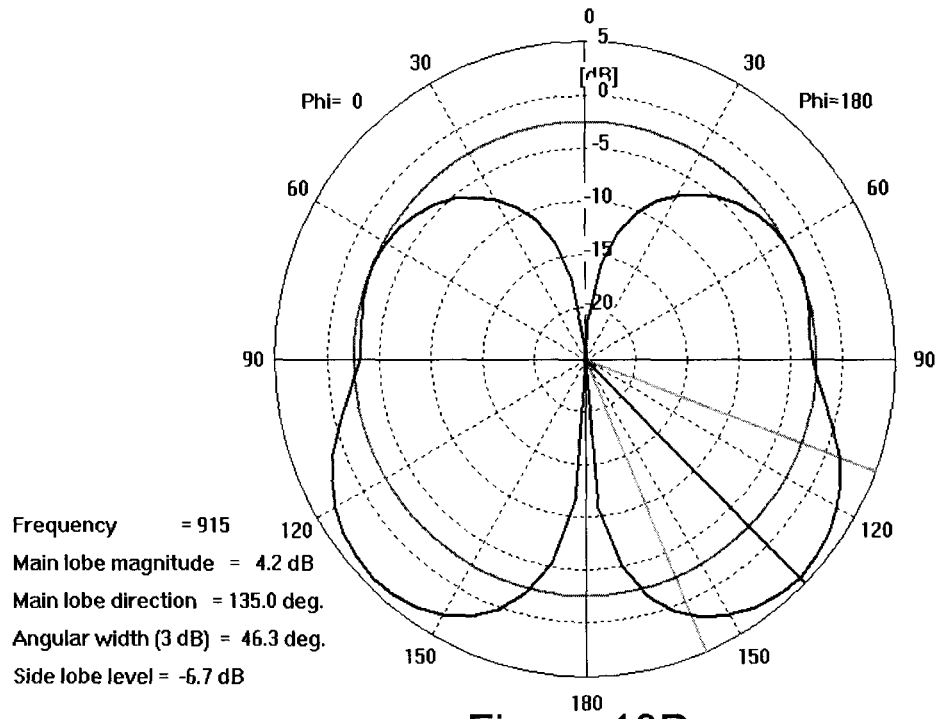
Figure 10E:
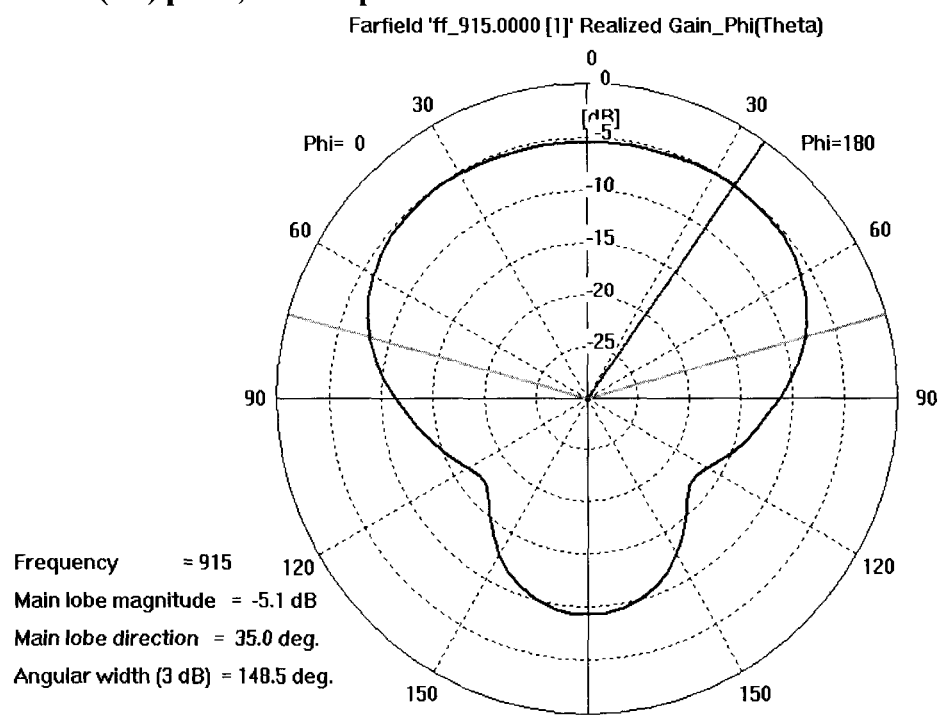

FIGS. 10A-10E depict characteristics of the F antenna 210D of FIG. 6D. The characteristics were determined through a simulation of the antenna located above the upper housing of a parking meter housing. FIG. 10A depicts the impedance matching characteristics of the F antenna 210D. FIGS. 10B-10E depict the transmission characteristics of the simulated antenna along different planes.

An improved location for an antenna of a wireless parking meter has been described above. The antenna is located above the upper housing of the parking meter housing within a fin cover that is constructed from a material with high permittivity to the RF signals used by the wireless parking meter. Although the fin cover provides for the desirable placement of the antenna above the upper housing of the parking meter, the antenna may be located in other positions. For example, as described above, the fin cover may be located on a portion of the parking meter housing. Furthermore, as described below, the antenna may also be located within the housing of the parking meter.

Figure 11C:
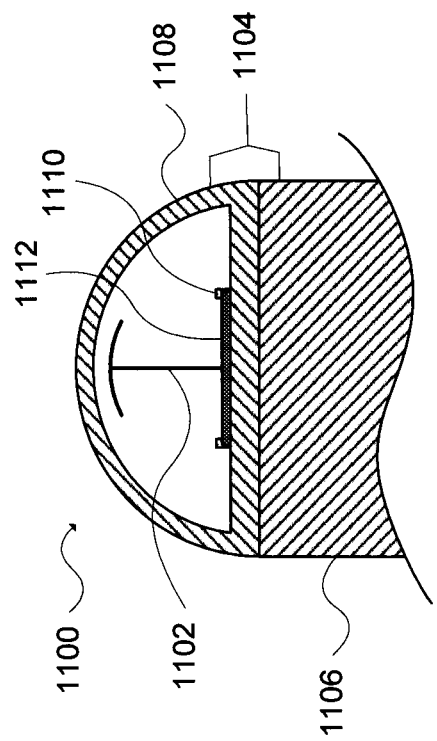
FIGS. 11A-11C depict schematics of an alternative antenna arrangement of an illustrative parking meter with improved antenna placement.
Figure 11A:
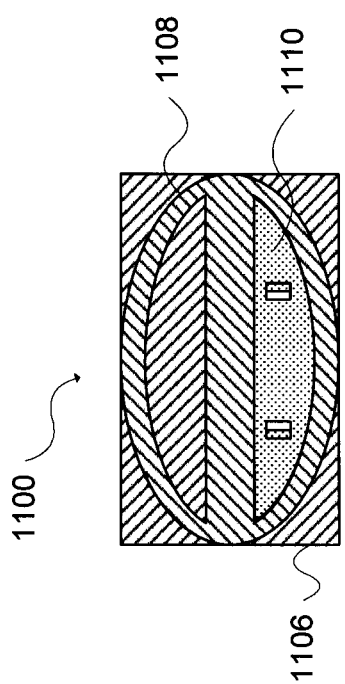
Figure 11B:
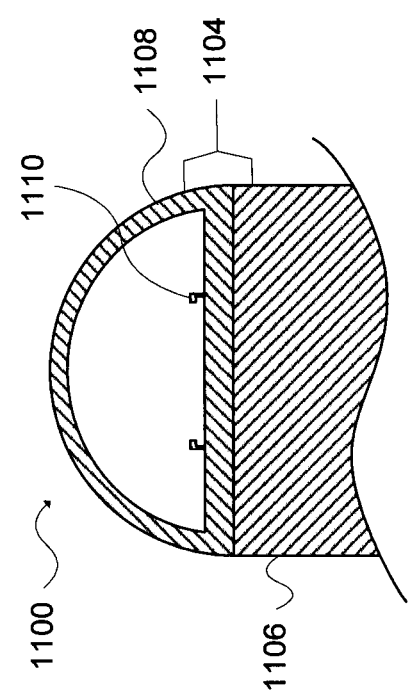

FIG. 11A-11C depict various views of an alternative embodiment of a wireless parking meter 1100. As seen in FIG. 11C, an antenna 1102 can be located within the housing 1104, above the lower mechanism housing 1106. The antenna 1102 is positioned within the opening of the upper housing 1108. A dome cover, such as dome cover 404, provides a transmission path, which has a high permittivity to RF signals. The upper housing 1108 may include a radio board holder 1110 for securing the radio board 1112, which may include the radio control module. The antenna 1102 may be positioned in front of the display as depicted, or may be located to one side of the display.

Unlike the antennas described above with reference to FIGS. 6A-D, which are formed on the radio board, the antenna 1102 is made from a self supporting wire that allows the antenna 1102 to be positioned vertically within the dome opening in the upper housing 1108, above the lower mechanism housing 1106. The self supported wire allows the antenna 1102 to be positioned in front of the display without blocking, or interfering with, the visibility of the display. The self supported antenna 1102 may be formed into various shapes. A T antenna is depicted in FIG. 11C.

Although the fin cover locates the antenna above the upper housing, it may require that the upper housing be modified to include a fin cover opening to allow the fin cover to protrude from the upper housing. While the self supported antenna may be positioned within the housing, and so avoid modification of the upper housing, it may not have as advantageous transmission characteristics as the fin cover placement. The display and the upper mechanical housing may provide a transmission path on one side of the antenna with low permittivity to the RF signals. Although one side of the antenna may be blocked by the relatively low permittivity of the display and upper mechanism housing, the transmission path from the other side of the antenna will advantageously pass through the opening in the upper housing through the dome cover. The dome cover is made from a transparent material with high permittivity to the RF signals.

As described herein, locating the antenna of the wireless parking meter so that the RF signals will have a transmission path that passes at least partly through a portion of the parking meter with high permittivity to RF signals, allows for more efficient transmission of RF signals. The more efficient transmission of RF signals from the wireless parking meter may provide either a more power efficient wireless parking meter, a wireless parking meter with extended communication range, or both.

Furthermore, the transmission efficiency can also be improved by improving the shape of the antenna. As described herein, a 'T' shaped antenna has superior transmission characteristics than previous antennas used in wireless parking meters. Although, the 'T' shape provides the best transmission characteristics according to the simulations and calculations performed, the 'L' shaped and 'F' shaped antennas also provided superior transmission characteristics for use in a wireless parking meter over a typical monopole antenna.

The embodiments described above are intended to be illustrative only. The scope of the invention is therefore intended to be limited solely by the scope of the appended claims.

What is claimed is:

1. A parking meter comprising:
   a mechanism housing comprising:
      an upper mechanism section enclosing a display module for displaying parking meter related information including an amount of parking meter time purchased; and
      a lower mechanism section enclosing parking meter mechanism components for operating the parking meter;
   a radio communication module coupled to at least one of the parking meter mechanism components through an electrical cable for wirelessly communicating parking meter information;
   a parking meter housing enclosing at least the mechanism housing, the parking meter housing comprising:
      an upper housing enclosing the upper mechanism section, the upper housing comprising an opening in the upper housing for viewing at least a portion of the display module and a second opening located above the upper mechanism section; and
      a lower housing enclosing the lower mechanism section;
   an antenna coupled to the radio communication module located above the mechanism housing to transmit and receive radio frequency (RF) signals through a transmission path comprising at least a portion of the parking meter that provides a low attenuation of RF signal, the antenna at least partially located within the second opening and extending outward from an interior side of the upper housing past the upper housing;
   a dome located within the upper housing sealing the opening in the upper housing, the dome comprising an opening coincident with the second opening of the upper housing; and
   a fin cover at least partially located within the second opening of the upper housing, extending outward and enclosing the antenna, the fin cover constructed from a material providing a low attenuation of the RF signals of the antenna to provide the transmission path of the antenna, wherein the fin cover passes through the opening in the dome, locating a base portion of the fin cover between a top surface of the upper mechanism section and the dome.

2. The parking meter as claimed in claim 1, wherein the dome is constructed from a material providing a low attenuation of the RF signals of the antenna to provide the transmission path of the antenna.

3. The parking meter as claimed in claim 2, wherein:
   the antenna comprises a self-supporting wire and is connected to the radio communication module.

4. The parking meter as claimed in claim 2, wherein the dome is constructed from a material selected from the group consisting of:
   LEXAN;
   CYCOLOY;
   GELOY;
   XENOY;
   XYLEX;
   NORYL;

ULTEM; and
VALOX.

5. The parking meter as claimed in claim 1, wherein the fin cover is constructed from a material selected from the group consisting of:
LEXAN;
CYCOLOY;
GELOY;
XENOY;
XYLEX;
NORYL;
ULTEM; and
VALOX.

6. The parking meter as claimed in claim 1, wherein the radio communication module is located on a radio board and the antenna comprises a trace of a configuration of the antenna on the radio board.

7. The parking meter as claimed in claim 6, wherein the configuration of the antenna is a monopole antenna.

8. The parking meter as claimed in claim 7, wherein a RF source and a capacitor connected in parallel with the RF source are coupled to the monopole antenna through an inductor.

9. A parking meter comprising:
a mechanism housing comprising:
an upper mechanism section enclosing a display module for displaying parking meter related information including an amount of parking meter time purchased; and
a lower mechanism section enclosing parking meter mechanism components for operating the parking meter;
a radio communication module coupled to at least one of the parking meter mechanism components through an electrical cable for wirelessly communicating parking meter information;
a parking meter housing enclosing at least the mechanism housing, the parking meter housing comprising:
an upper housing enclosing the upper mechanism section, the upper housing comprising an opening in the upper housing for viewing at least a portion of the display module and a second opening located above the upper mechanism housing; and
a lower housing enclosing the lower mechanism section;
an antenna coupled to the radio communication module located above the mechanism housing to transmit and receive radio frequency (RF) signals through a transmission path comprising at least a portion of the parking meter that provides a low attenuation of RF signal, the antenna at least partially located within the second opening and extending outward from an interior side of the upper housing past the upper housing;
a dome located within the upper housing sealing the opening in the upper housing; and
a fin cover at least partially located within the second opening of the upper housing, extending outward and enclosing the antenna, the fin cover constructed from a material providing a low attenuation of the RF signals of the antenna to provide the transmission path of the antenna, wherein a base portion of the fin cover is located between a top surface of the dome and the upper housing.

10. The parking meter as claimed in claim 9, wherein the fin cover is constructed from a material selected from the group consisting of:
LEXAN;
CYCOLOY;
GELOY;
XENOY;
XYLEX;
NORYL;
ULTEM; and
VALOX.

11. The parking meter as claimed in claim 9, wherein the radio communication module is located on a radio board and the antenna comprises a trace of a configuration of the antenna on the radio board.

12. The parking meter as claimed in claim 11, wherein the configuration of the antenna is a monopole antenna.

13. The parking meter as claimed in claim 12, wherein a RF source and a capacitor connected in parallel with the RF source are coupled to the monopole antenna through an inductor.

14. The parking meter as claimed in claim 9, wherein the dome is constructed from a material with a low attenuation of the RF signals of the antenna to provide the transmission path of the antenna.

15. The parking meter as claimed in claim 14, wherein:
the antenna comprises a self-supporting wire and is connected to the radio communication module.

16. The parking meter as claimed in claim 15, wherein the configuration of the antenna is a monopole antenna.

17. The parking meter as claimed in claim 14, wherein the dome is constructed from a material selected from the group consisting of:
LEXAN;
CYCOLOY;
GELOY;
XENOY;
XYLEX;
NORYL;
ULTEM; and
VALOX.

18. The parking meter as claimed in claim 17, wherein a RF source and a capacitor connected in parallel with the RF source are coupled to the monopole antenna through an inductor.

19. A parking meter comprising:
a mechanism housing comprising:
an upper mechanism section enclosing a display module for displaying parking meter related information including an amount of parking meter time purchased; and
a lower mechanism section enclosing parking meter mechanism components for operating the parking meter;
a radio communication module coupled to at least one of the parking meter mechanism components through an electrical cable for wirelessly communicating parking meter information;
a parking meter housing enclosing at least the mechanism housing, the parking meter housing comprising:
an upper housing enclosing the upper mechanism section, the upper housing comprising an opening in the upper housing for viewing at least a portion of the display module and a second opening located above the upper mechanism housing; and
a lower housing enclosing the lower mechanism section; and
an antenna coupled to the radio communication module located above the mechanism housing to transmit and receive radio frequency (RF) signals through a transmission path comprising at least a portion of the parking meter that provides a low attenuation of RF signals, the antenna at least partially located within the second opening and extending outward from an interior side of the upper housing past the upper housing;

a dome located within the upper housing sealing the opening in the upper housing, the dome comprising an opening coincident with the second opening of the upper housing; and a fin cover at least partially located within the second opening of the upper housing, extending outward and enclosing the antenna, the fin cover constructed from a material providing a low attenuation of the RF signals of the antenna to provide the transmission path of the antenna, wherein the antenna passes through the opening in the dome, and a base portion of the fin cover is located between a top surface of the dome and the upper housing.

20. The parking meter as claimed in claim 19, wherein the fin cover is constructed from a material selected from the group consisting of:
LEXAN;
CYCOLOY;
GELOY;
XENOY;
XYLEX;
NORYL;
ULTEM; and
VALOX.

21. The parking meter as claimed in claim 19, wherein the radio communication module is located on a radio board and the antenna comprises a trace of a configuration of the antenna on the radio board.

22. The parking meter as claimed in claim 19, wherein the dome is constructed from a material with a low attenuation of the RF signals of the antenna to provide the transmission path of the antenna.

23. The parking meter as claimed in claim 22, wherein: the antenna comprises a self-supporting wire and is connected to the radio communication module.

24. The parking meter as claimed in claim 23, wherein the dome is constructed from a material selected from the group consisting of:
LEXAN;
CYCOLOY;
GELOY;
XENOY;
XYLEX;
NORYL;
ULTEM; and
VALOX.

25. A parking meter comprising:
a mechanism housing comprising:
an upper mechanism section enclosing a display module for displaying parking meter related information including an amount of parking meter time purchased; and
a lower mechanism section enclosing parking meter mechanism components for operating the parking meter;
a radio communication module coupled to at least one of the parking meter mechanism components for wirelessly communicating parking meter information;
a parking meter housing enclosing at least the mechanism housing, the parking meter housing comprising:
an upper housing enclosing the upper mechanism section, the upper housing comprising a display opening in the upper housing for viewing at least a portion of the display module; and
a lower housing enclosing the lower mechanism section; and
an antenna coupled to the radio communication module, the antenna located above the mechanism housing to transmit and receive radio frequency (RF) signals, the antenna having a shape selected from the group consisting of:
a 'T' shaped antenna, wherein a RF source and a capacitor connected in parallel with the RF source are coupled to a base of the T antenna through an inductor;
an 'F' shaped antenna, wherein a RF source is coupled to an arm of the F antenna; and
an V shaped antenna, wherein a RF source and a capacitor connected in parallel with the RF source are coupled to a leg of the L antenna; and
an antenna cover connected to at least a portion of the parking meter housing and enclosing the antenna to provide protection from an external environment, the antenna cover providing a low attenuation transmission path for the RF signals separate from the display opening.

26. The parking meter as claimed in claim 25, wherein the antenna is formed as a metal trace on a radio board.

27. A parking meter comprising:
a meter mechanism comprising components for providing metering functionality and a display;
a radio communication module coupled to at least one of the components of the meter mechanism for wirelessly communicating parking meter information;
a parking meter housing enclosing the meter mechanism, the parking meter housing comprising:
an upper housing comprising a display opening for viewing at least a portion of the display; and
a lower housing enclosing a lower portion of the meter mechanism; and
an antenna coupled to the radio communication module to transmit and receive radio frequency (RF) signals, the antenna at least partially located externally to the meter mechanism and at least partially located externally to the parking meter housing; and
an antenna cover connected to at least a portion of the parking meter housing and enclosing the antenna to provide protection from an external environment, the antenna cover providing a low attenuation transmission path for the RF signals separate from the display opening.

28. The parking meter of claim 27, wherein the parking meter housing comprises a section comprised of a material that provides a low attenuation of RF signals, the section located adjacent the antenna and providing the transmission path.

29. The parking meter of claim 27, further comprising a transparent cover sealing the opening in the parking meter housing.

30. The parking meter of claim 27, wherein the antenna cover passes through an antenna opening in the parking meter housing.

31. The parking meter of claim 30, wherein the antenna opening comprises an opening in the transparent cover.

32. The parking meter of claim 27, wherein the antenna is provided on an antenna printed circuit board (PCB).

33. The parking meter of claim 32, wherein the radio communication module is located on the antenna PCB.

34. The parking meter of claim 33, wherein the antenna cover has a fin shape.

35. The parking meter of claim 34, wherein the transparent cover has a dome shape.

36. The parking meter as claimed in claim 27, wherein the transmission path comprises a material selected from the group consisting of:
   LEXAN;
   CYCOLOY;
   GELOY;
   XENOY;
   XYLEX;
   NORYL;
   ULTEM; and
   VALOX.

\* \* \* \* \*